(12) United States Patent
Wang et al.

(10) Patent No.: US 11,462,232 B1
(45) Date of Patent: Oct. 4, 2022

(54) METHODS AND SYSTEMS FOR VISUALIZING AUDIO PROPERTIES OF OBJECTS

(71) Applicant: Apple Inc., Cupertino, CA (US)

(72) Inventors: Jue Wang, San Mateo, CA (US); Zachary Becker, Santa Clara, CA (US); Karen Natalie Wong, Sunnyvale, CA (US); Robin-Yann Joram Storm, Amsterdam (NL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/350,244

(22) Filed: Jun. 17, 2021

Related U.S. Application Data

(60) Provisional application No. 63/046,137, filed on Jun. 30, 2020.

(51) Int. Cl.
*G10L 21/14* (2013.01)
*G06F 3/16* (2006.01)
*H04R 5/02* (2006.01)
*H04R 5/04* (2006.01)
*H04S 7/00* (2006.01)

(52) U.S. Cl.
CPC .............. *G10L 21/14* (2013.01); *G06F 3/165* (2013.01); *H04R 5/02* (2013.01); *H04R 5/04* (2013.01); *H04S 7/303* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 10,911,885 B1* | 2/2021 | Chemistruck | H04S 5/005 |
| 2021/0004201 A1* | 1/2021 | Munoz | G06F 3/165 |
| 2021/0006925 A1* | 1/2021 | Munoz | G06F 3/165 |
| 2021/0048975 A1* | 2/2021 | Panwar | G06V 10/25 |
| 2021/0168554 A1* | 6/2021 | Zhang | H04R 1/28 |

FOREIGN PATENT DOCUMENTS

| | | | | |
|---|---|---|---|---|
| CN | 107329980 A | * | 11/2017 | |
| CN | 109891503 A | * | 6/2019 | G10L 19/008 |
| CN | 112534395 A | * | 3/2021 | G06F 3/165 |

* cited by examiner

*Primary Examiner* — Qin Zhu
(74) *Attorney, Agent, or Firm* — Fernando & Partners, LLP

(57) ABSTRACT

In one implementation, a method of playing audio is performed at a device including one or more processors coupled to non-transitory memory. The method includes playing audio associated with an object at a frequency-dependent volume based on a distance between a user location and an object location, an object orientation with respect to the user location, and the frequency-dependent three-dimensional audio emission pattern. In various implementations, methods of visualizing the frequency-dependent three-dimensional audio emission pattern and changing properties thereof are disclosed.

20 Claims, 22 Drawing Sheets

400

410 — At a device with a display, one or more speakers, one or more processors, and non-transitory memory:

Displaying, using a display, an environment from the perspective of a user location, wherein the environment includes an object located at an object location in the environment, oriented at an object orientation with respect to the user location, and associated with a frequency-dependent three-dimensional audio emission pattern

420 — Determining, based on a distance between the user location and the object location, the object orientation with respect the user location, and the frequency-dependent three-dimensional audio emission pattern, a frequency-dependent volume for audio associated with the object

430 — Playing, using the one or more speakers, the audio at the frequency-dependent volume

At a device including one or more processors coupled to non-transitory memory:

Displaying, using a display, a representation of a scene including a representation of an object associated with a three-dimensional audio emission pattern ⎯510

↓

Determining a visualization type ⎯520

↓

Displaying, using the display, a visualization of the three-dimensional audio emission pattern based on the visualization type ⎯530

Figure 5

METHODS AND SYSTEMS FOR VISUALIZING AUDIO PROPERTIES OF OBJECTS

CROSS-REFERENCES TO RELATED APPLICATIONS

This application claims priority to U.S. Provisional Patent No. 63/046,137, filed on Jun. 30, 2020, which is hereby incorporated by reference in its entirety.

TECHNICAL FIELD

The present disclosure generally relates to visualizing audio properties of objects, such as the volume or directivity of a virtual object in an extended reality (XR) environment.

BACKGROUND

In various implementations, XR environments include objects that emit sound. However, in physical environments, various objects emit sounds directionally, such that the volume of the sound depends on the orientation of the listener with respect to the object. Further, in physical environments, the directivity depends on the frequency of the sound emitted.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of a method of playing audio in accordance with some implementations.

FIG. 5 is a flowchart representation of a method of displaying a visualization of an audio emission pattern in accordance with some implementations.

Figure 1:
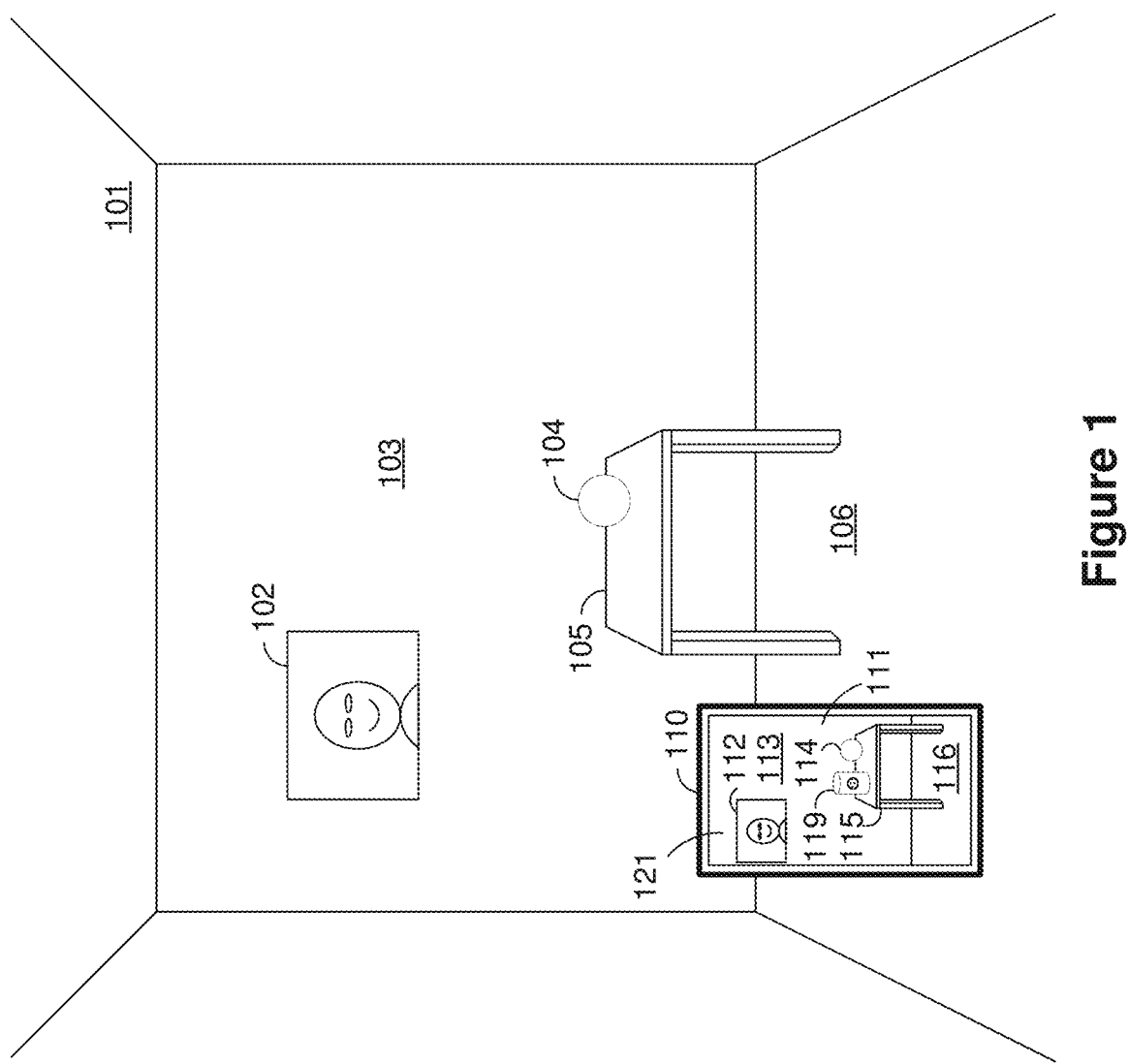
FIG. 1 illustrates a physical environment with an electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for playing audio. In various implementations, a method is performed at a device including one or more processors coupled to non-transitory memory. The method includes displaying, using a display, an environment from the perspective of a user location, wherein the environment includes an object located at an object location in the environment, oriented at an object orientation with respect to the user location, and associated with a frequency-dependent three-dimensional audio emission pattern. The method includes determining, based on a distance between the user location and the object location, the object orientation, and the frequency-dependent three-dimensional audio emission pattern, a frequency-dependent volume for audio associated with the object. The method includes playing, using one or more speakers, the audio at the frequency-dependent volume.

Various implementations disclosed herein include devices, systems, and methods for displaying a visualization of an audio emission pattern. In various implementations, a method is performed at a device including one or more processors coupled to non-transitory memory. The method includes displaying, using a display, a representation of a scene including a representation of an object associated with a three-dimensional audio emission pattern. The method includes determining a visualization type. The method includes displaying, using the display, a visualization of the three-dimensional audio emission pattern based on the visualization type.

Various implementations disclosed herein include devices, systems, and methods for displaying a frequency response curve of an audio emission pattern. In various implementations, a method is performed at a device including one or more processors coupled to non-transitory memory. The method includes displaying, using a display, a representation of a scene including a representation of an object associated with a three-dimensional audio emission pattern. The method includes determining a listener location in a three-dimensional coordinate system of the scene. The method includes determining a frequency response curve of the three-dimensional audio emission pattern at the listener location. The method includes displaying a representation of the frequency response curve.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

In a physical environment, many objects emit sound directionally, such that the volume of the sound depends on the orientation of the user with respect to the object. For example, the perceived volume of a person speaking is greater when standing in front of the person than behind the person. Further, in physical environments, the directivity of the emitted sound varies with frequency. For example, the low-frequency component of speech from a person may be heard at close to the same volume regardless of whether the listener is standing in front of the person or behind the person, but the high-frequency component of the speech may only be heard when standing in front of the person. Thus, while standing behind a person, the speech is perceived as a mumble, whereas, while standing in front of the person, clear speech is perceived.

To create a realistic XR environment, it is desirable that the volume of sound emitted by certain virtual objects depends on the orientation of the user with respect to the virtual object in the XR environment. Further, in various circumstances, it is desirable that the volume further depend on the frequency of the sound emitted. Thus, in various implementations, a graphical user interface (GUI) is provided for composing scenes including objects that emit sound in a directional manner and, in particular, in a frequency-dependent directional manner. Further, the GUI provides various options for manipulating audio properties, such as the volume or directionality, of such objects and for visualizing the audio properties.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical environment 101, the image of the XR environment 121 includes a representation of the virtual object 119. The visual appearance of the virtual object 119 is defined by software on the electronic device 110. The electronic device 110 presents the virtual object 119 as resting on the top surface of the representation of the table 115 by accounting for the position and orientation of the electronic device 110 in the physical environment 101, for example, the position and orientation of the electronic device 110 relative to the table 105.

Figure 2B:
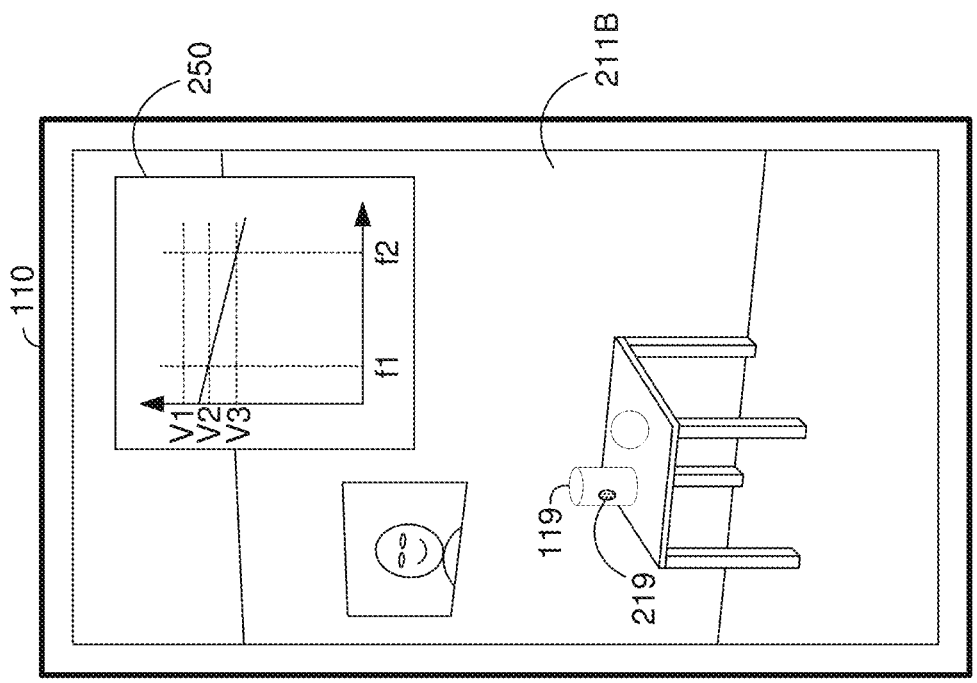
FIGS. 2A-2D illustrate the electronic device of FIG. 1 displaying objects from various perspectives.
Figure 2A:
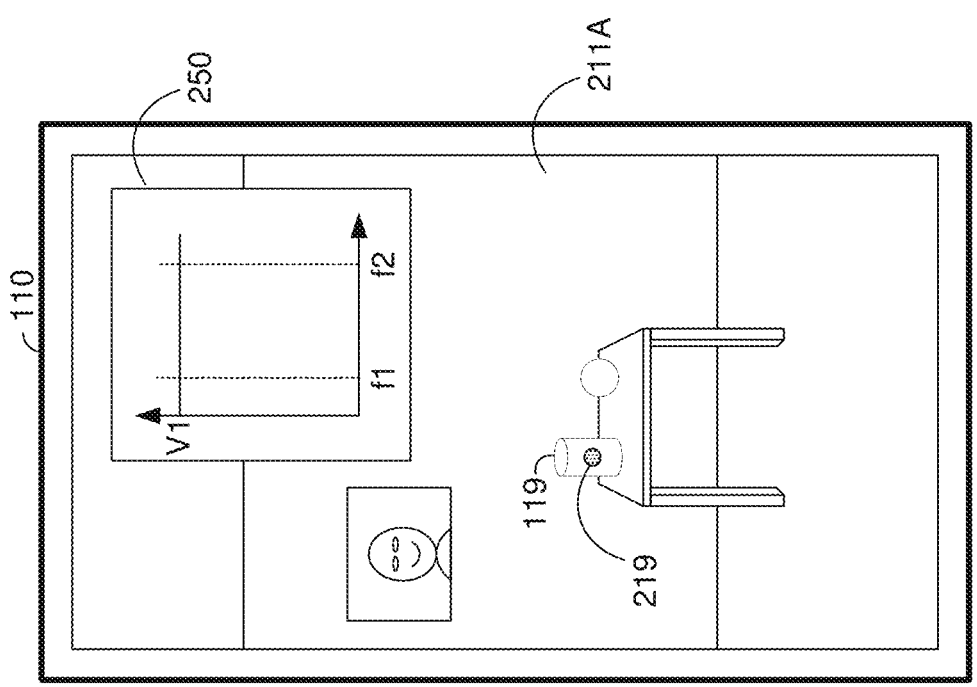

FIG. 2A illustrates the electronic device 110 displaying a first image 211A of the XR environment from a first perspective of a first user location. In various implementations, the user location is the location of a camera of the electronic device 110. For example, in various implementations, the electronic device 110 is a handheld electronic device and the user location is the location of the camera of the handheld electronic device. In various implementations, the user location is the location of a user of the electronic device 110. For example, in various implementations, the electronic device is a head-mounted electronic device and the user location is the location of the user. In various implementations, the user location is the location of an avatar of the user. For example, in various implementations, the XR environment is a virtual environment and the user location is the location of an avatar or other representation of the user.

The first image 211A includes the virtual object 119, which includes an audio emitter object 219 located at an object location and associated with an audio emission line pointed at the first user location. The first image 211A includes a volume meter 250 indicating the volume of audio played at the first user location at various frequencies. In particular, in the first image 211A, the volume at a first frequency, f1, is a first volume, V1, and the volume at a second frequency, f2, is a second volume, V2. In various implementations, the volume meter 250 is not displayed. However, for ease of explanation, the volume meter 250 is illustrated in FIGS. 2A-2D.

FIG. 2B illustrates the electronic device 110 displaying a second image 211B of the XR environment from a second perspective of a second user location. The second user location is the same distance from the object location as the first user location, but at an angle to the audio emission line. In particular, the first user location and the object location define the audio emission line and the second user location and the object location define a relative position line. In FIG. 2B, the angle between the audio emission line and the relative position line is non-zero, approximately 60 degrees.

The second image 211B includes the virtual object 119 including the audio emitter object 219. Because the second image 211B is from the second perspective of the second user location and the audio emitter object 219 is pointed at the first user location and the angle between the audio emission line and the relative position line is non-zero, the volume of audio played at the second user location is less than the volume of audio played at the first user location. Thus, the sound is quieter or less intense. Further, the change in volume is frequency-dependent such that the change in volume is greater at higher frequencies than at lower frequencies. Accordingly, the second image 211B includes the volume meter 250 indicating the volume of audio played at the second user location at the first frequency, f1, is a second volume, V2, less than the first volume, V1, and the volume of audio played at the second user location at the second frequency, f2, is a third volume, V3, less than the first volume, V1, and also less than the second volume, V2. Thus, the difference between the first volume, V1, and the second volume, V2, is less than the difference between the first volume, V2, and the third volume, V3.

Figure 2D:
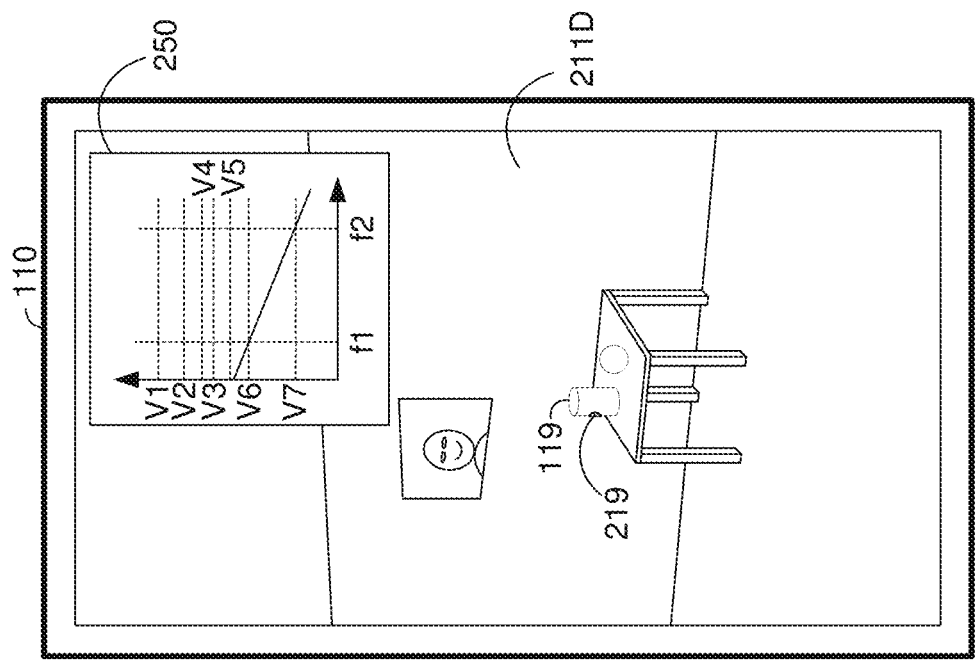
Figure 2C:
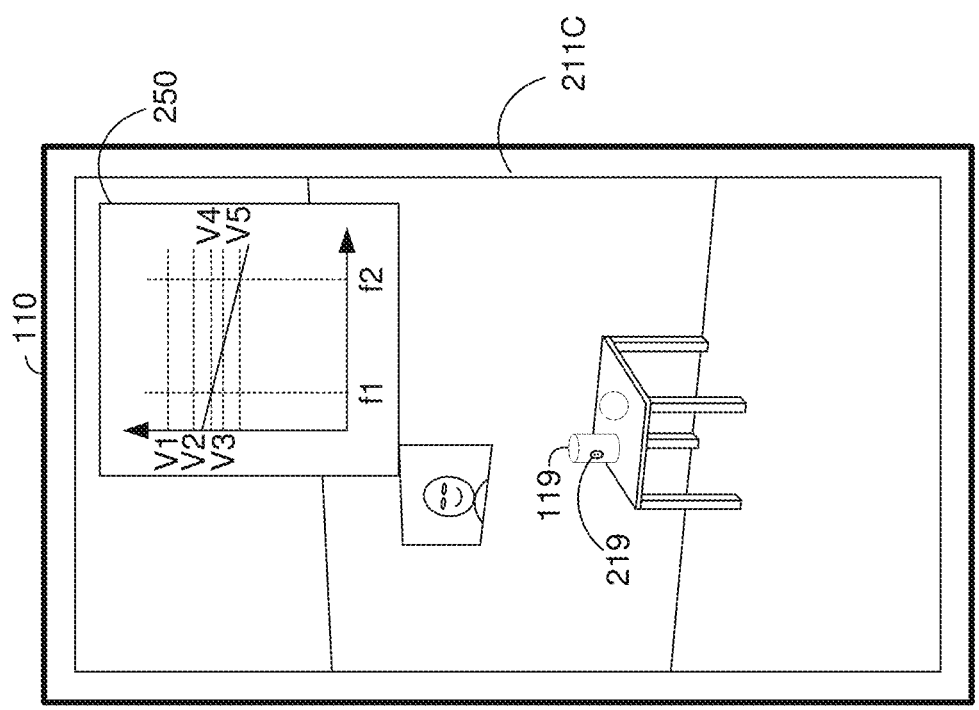

FIG. 2C illustrates the electronic device 110 displaying a third image 211C of the XR environment from a third perspective of a third user location. The third image 211C includes the virtual object 119 including the audio emitter object 219. The third user location is at the same angle from the audio emission line as the second user location, but at a larger distance from the object location as the second user location. Because the third image 211C is from the third perspective of the third user location and the audio emitter object 219 is further away than the second user location, the volume of the audio played at the third user location is less than the volume of audio played at the second user location. Thus, the sound is quieter or less intense. In various implementations, the change in volume due to a change in distance is independent of frequency insofar as geometric spreading is independent of frequency. However, in various implementations, the change in volume due to a change in distance is dependent on frequency. For example, propagation through many media (such as air or water) is frequency-dependent, particularly over large distances. Accordingly, the third image 211C includes the volume meter 250 indicating the volume of audio played at the third user location at the first frequency, f1, is a fourth volume, V4, less than the second volume, V2, and the volume of audio played at the third user location at the second frequency, f2, is a fifth volume, V5, less than the third volume, V3. In various implementations, the difference between the second volume, V2, and the fourth volume, V4, is the same as the difference between the third volume, V3, and the fifth volume, V5. In various implementations, the difference between the second volume, V2, and the fourth volume, V4, is less than, the difference between the third volume, V3, and the fifth volume, V5.

FIG. 2D illustrates the electronic device 110 displaying a fourth image 211D of the XR environment from the third perspective of the third user location. Thus, the user location of FIG. 2C and FIG. 2D is the same. The fourth image 211D includes the virtual object 119 including the audio emitter object 219. However, in the fourth image 211D, as compared to the third image 211C, the virtual object 119 has been rotated. Further, the audio emitter object 219 has been rotated and moved such that the audio emission line does not point at the first user location, but rather in a different direction with a larger angle to the relative position line defined by the object location and the third user location. Because the angle is larger, the volume of audio played at the third user location after the virtual object 119 has rotated is less than the volume of audio played at the third user location before the virtual object 119 had rotated. Thus, the sound is quieter or less intense. Further, the change in volume is frequency-dependent such that the change in volume is greater at higher frequencies than at lower frequencies. Accordingly, the second image 211B includes the volume meter 250 indicating the volume of audio played at the third user location after the virtual object 119 has rotated at the first frequency, f1, is a sixth volume, V6, less than the fourth volume, V4, and the volume of audio played at the third user location after the virtual object 119 has rotated at the second frequency, f2, is a seventh volume, V7, less than the fifth volume, V5. Further, the difference between the fourth volume, V4, and the sixth volume, V6, is less than the difference between the fifth volume, V5, and the seventh volume, V7.

Figure 3A:
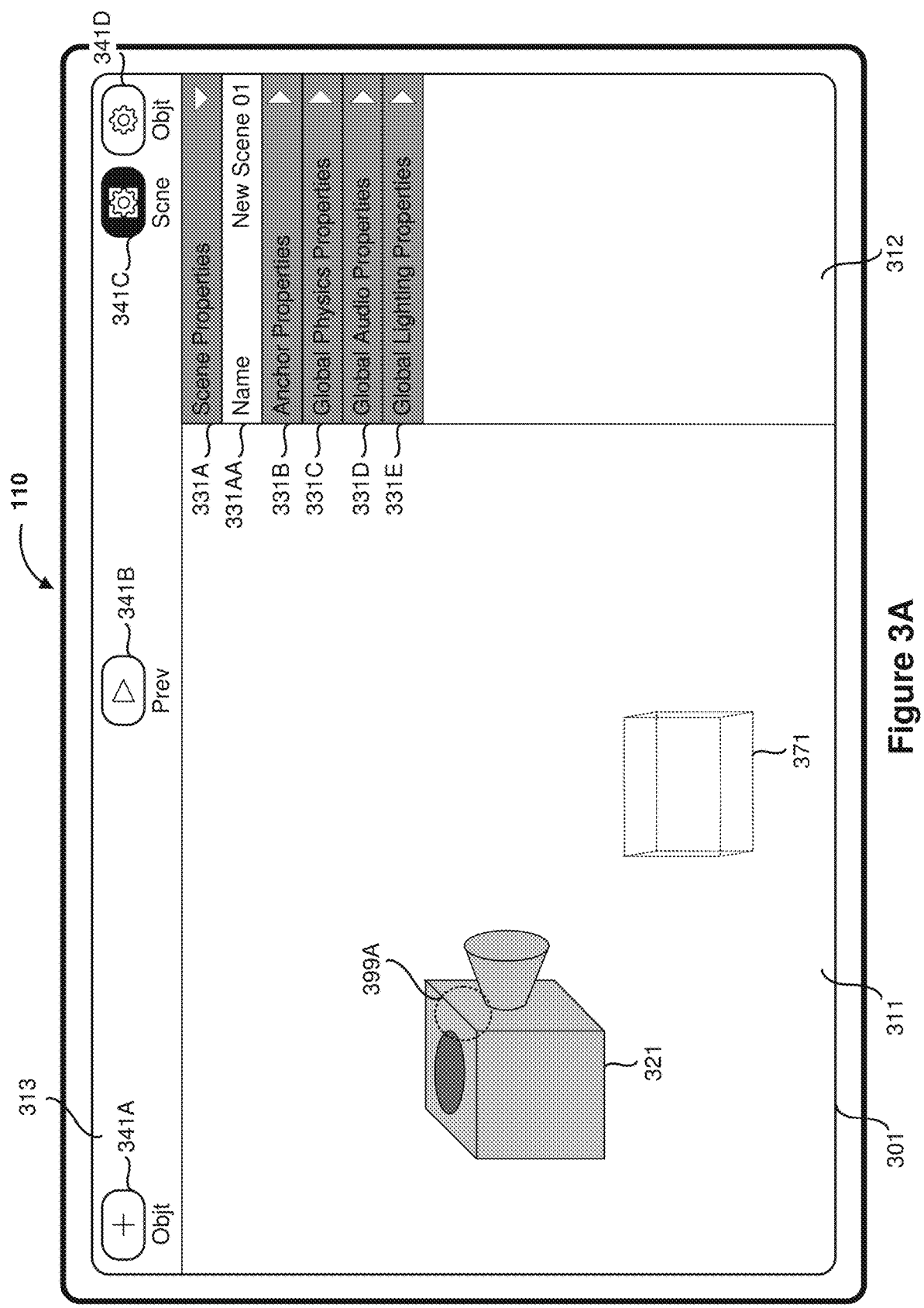
FIGS. 3A-3O illustrate the electronic device of FIG. 1 displaying a graphical user interface (GUI) for composing a scene.

FIG. 3A illustrates the electronic device 110 displaying a graphical user interface (GUI) 301 for composing a scene. In particular, the GUI 301 includes a representation of the scene in a three-dimensional coordinate system of the scene. In various implementations, an application of the electronic device 110 or a different electronic device executes to present the scene in an XR environment, such as a virtual environment or in association with a representation of a physical environment. In various implementations, when the scene is presented in an XR environment, the three-dimensional coordinate system of the scene is translated into a three-dimensional coordinate system of the XR environment.

The GUI 301 includes a view region 311, a settings region 312, and a toolbar region 313. The view region 311 includes a representation of the scene from a view location, or camera location. In various implementations, the view location is changeable by a user via user input to camera controls or other user input. In various implementations, the scene includes a virtual record player. Accordingly, in FIG. 3A, the representation of the scene in the view region 311 includes a representation of the virtual record player 321. In various implementations, the scene includes an invisible object. Accordingly, in FIG. 3A, the representation of the scene in the view region 311 includes a representation of the invisible object 371. Unlike the virtual record player, the invisible object is not displayed when the scene is presented. However, like the virtual record player, the invisible object can be associated with audio emitters as described further below.

Figure 3B:
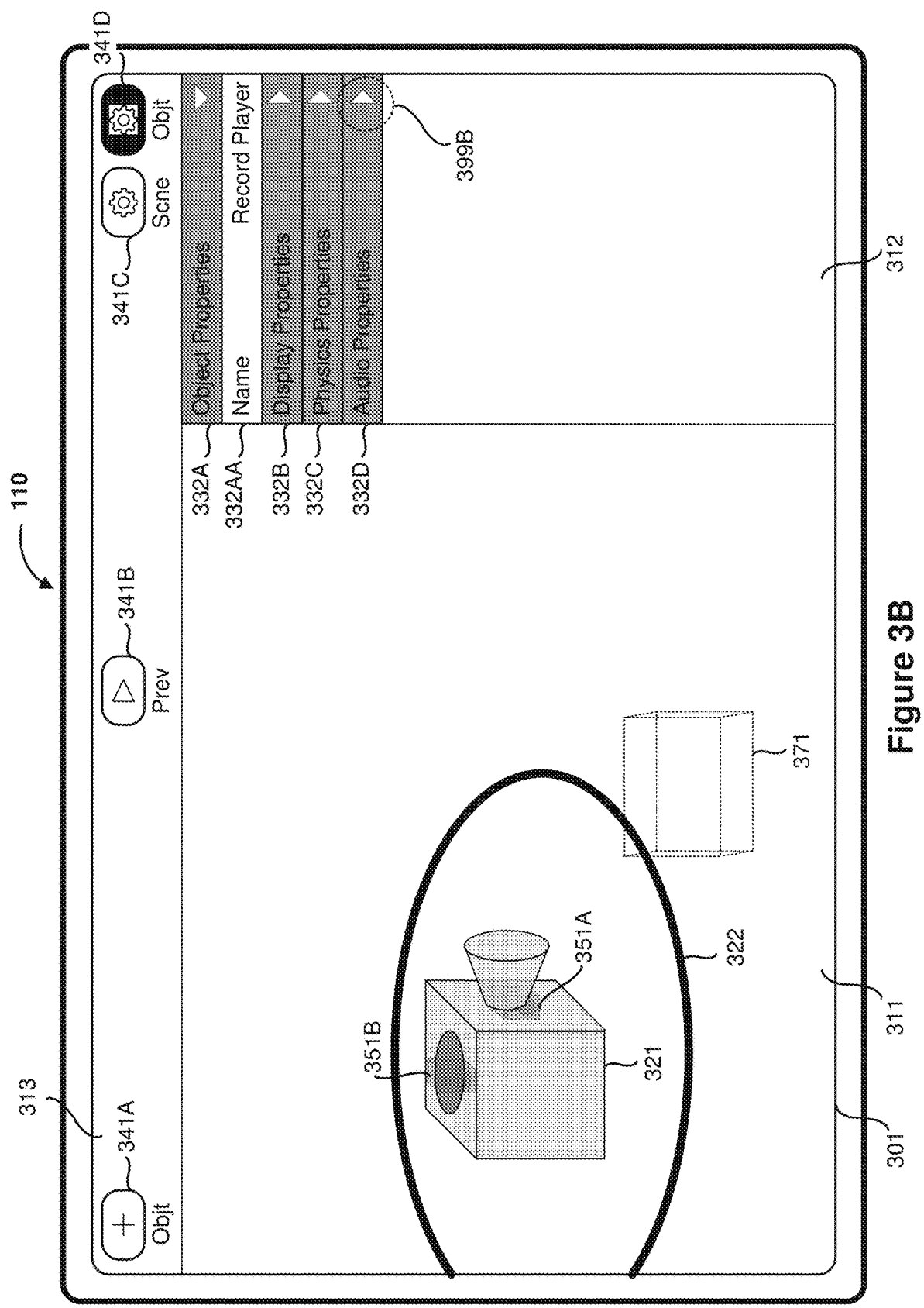

The settings region 312 includes, as illustrated in FIG. 3A, a plurality of scene settings manipulation affordances or, as illustrated in FIG. 3B, a plurality of object settings manipulation affordances depending on whether the scene settings affordance 341C in the toolbar region 313 or the object settings affordance 341D in the toolbar region 313 is selected. In FIG. 3A, the different display of the scene settings affordance 341C as compared to the object settings affordance 341D and other affordances of the toolbar region 313 indicates that the scene settings affordance 341C is selected. Accordingly, the settings region 312 includes a number of scene settings manipulation affordances presented via collapsible and expandable scene setting menus 331A-331E. In FIG. 3A, an exemplary scene setting manipulation affordance, the scene name manipulation affordance 33 IAA for changing a name of the scene is shown.

The scene settings menus 331A-331E include a scene properties menu 331A including scene settings manipulation affordances for changing scene properties of the scene such as a name of the scene. The scene settings menus 331A-331E includes an anchor properties menu 331B including scene setting manipulation affordances for changing anchor properties of the scene such as whether the scene is displayed on a detected horizontal surface, detected vertical surface, or detected object. The scene settings menus 331A-331E include a global physics properties menu 331C including scene setting manipulation affordances for changing physics properties of the scene such as whether objects of the scene interact and/or a presence and/or strength of gravity. The scene settings menus 331A-331E include a global audio properties menu 331D including scene setting manipulation affordances for changing audio properties of the scene such as a sound to be played while the scene is presented, e.g., a soundtrack, or audio effects to be applied to real sounds detected while the scene is presented, e.g., a reverb or an attenuation. The scene settings menus 331A-331E include a global lighting properties menu 331E for changing lighting properties of the scene such as a directional or omnidirectional light to be rendered when the scene is presented or how real light affects display of objects of the scene. In various implementations, the settings region 312 includes additional and/or fewer scene settings menus and/or scene settings manipulation affordances.

The toolbar region 313 includes an object addition affordance 341A for adding objects to the scene, a preview affordance 341B for previewing the scene, the scene settings affordance 341C for displaying scene setting manipulation affordances in the settings region 312, and the object settings affordance 341D for displaying object setting manipulation affordances in the settings region 312. In various implementations, the toolbar region 313 includes additional and/or fewer affordances.

FIG. 3A illustrates a user input 399A directed to the representation of the virtual record player 321. In various implementations, the user input 399A is input by a user tapping a finger or stylus on a touch-sensitive display at the location of the representation of the virtual record player 321. In various implementations, the user input 399A is input by a user clicking a mouse button while a cursor is displayed at the location of the representation of the virtual record player 321.

FIG. 3B illustrates the GUI 301 of FIG. 3A in response to detecting the user input 399A directed to the representation of the virtual record player 321. In response to detecting the user input 399A directed to the representation of the virtual record player 321, a selection indicator 322 is displayed in association with the representation of the virtual record player 321. In FIG. 3B, the selection indicator 322 is displayed as a ring surrounding the representation of the virtual record player 321. Further, the scene settings affordance 341C in the toolbar region 313 is deselected and the object settings affordance 341D in the toolbar region 313 is selected. Accordingly, the settings region 312 includes a plurality of object setting manipulation affordances presented via collapsible and expandable object setting menus 332A-332D. In FIG. 3B, an exemplary object setting manipulation affordance, the object name manipulation affordance 332AA for changing a name of the currently selected object is shown. Like the selection indicator 322 displayed in association with the representation of the virtual record player 321, the object name manipulation affordance 332AA displaying the name of the virtual record player (e.g., "Record Player") indicates that the virtual record player is selected.

In response to the selection of the virtual record player, representations of audio emitter objects 351A-351B associated with the virtual record player are displayed in conjunction with the representation of the virtual record player 321. In various implementations, the representations of the audio emitter objects 351A-351B are displayed as partially transparent and the representation of the virtual record player is not displayed as partially transparent when the virtual record player is selected. In contrast, and as will be illustrated below, when a representation of an audio emitter object 351A-351B is selected, as in FIG. 3E, the representation of the virtual record player 321 is displayed as partially transparent and the representations of the audio emitter objects 351A-351B are not displayed as partially transparent. In various implementations, the representation of the virtual record player 321 is displayed as partially transparent and the representations of the audio emitter objects 351A-351B are not displayed as partially transparent when the audio properties menu 332D is expanded, as in FIG. 3C.

The object settings menus 332A-332D include an object properties menu 332A including object settings manipulation affordances for changing object properties of the currently selected object such as a name of the object. The object settings menus 332A-332D include a display properties menu 332B including display setting manipulation affordances for changing display or rendering properties of the currently selected object such as a shape, color, or optical transmission of the object. The object settings menus 332A-332D include a physics properties menu 332C including object setting manipulation affordances for changing physics properties of the currently selected object such as light reflectivity of the object or elasticity of the object. The object settings menus 332A-332D include an audio properties menu 332D including object setting manipulation affordances for changing audio properties of the currently selected object as described in detail below. In various implementations, settings region 312 includes additional and/or fewer object settings menus and/or object settings manipulation affordances.

FIG. 3B illustrates a user input 399B directed to the audio properties menu 332D. In various implementations, the user input 399B is input by a user tapping a finger or stylus on a touch-sensitive display at the location of the audio properties menu 332D. In various implementations, the user input 399B is input by a user clicking a mouse button while a cursor is displayed at the location of the audio properties menu 332D.

Figure 3C:
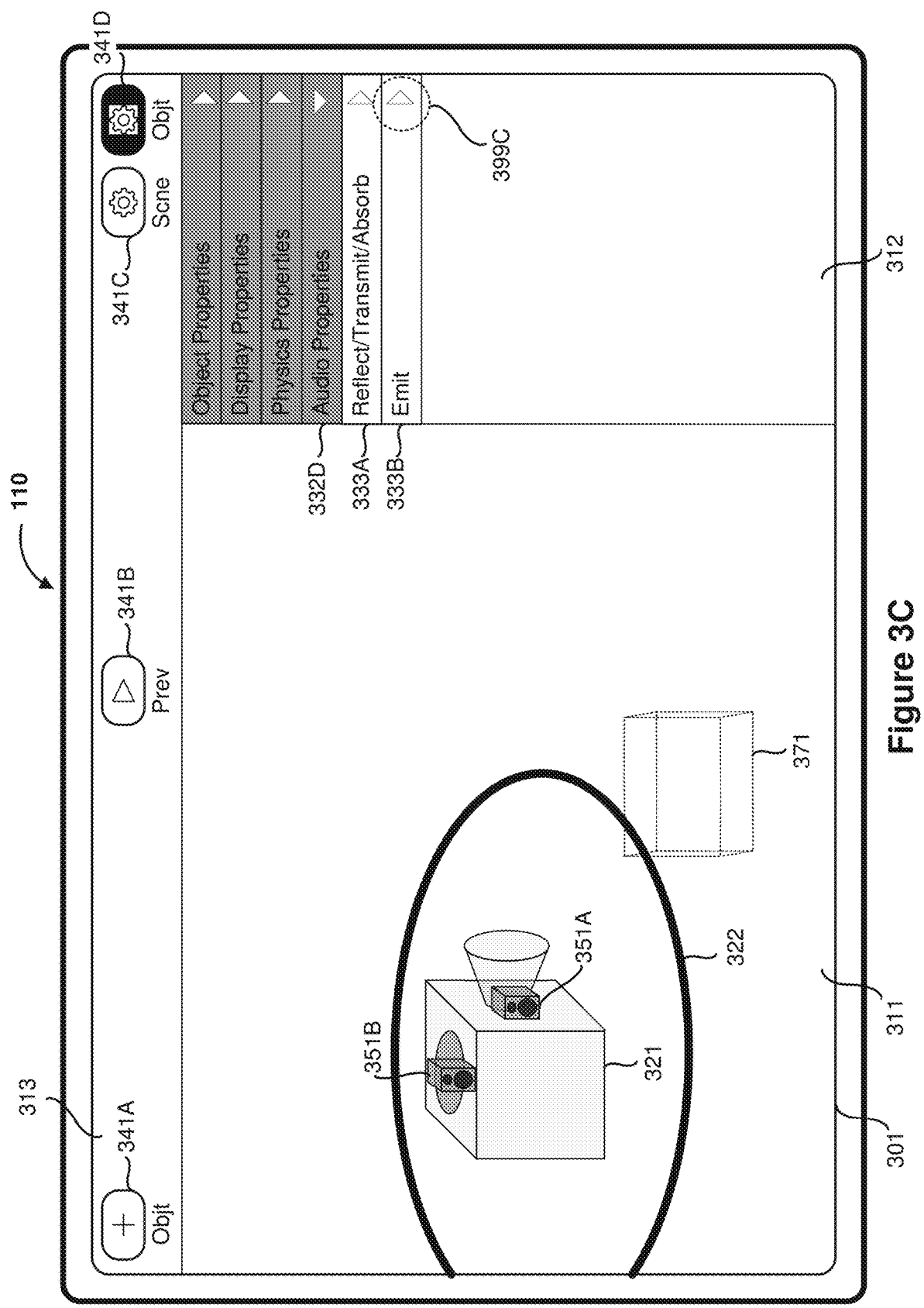

FIG. 3C illustrates the GUI 301 of FIG. 3B in response to detecting the user input 399B directed to the audio properties menu 332D. In response to detecting the user input 399B directed to the audio properties menu 332D, the audio properties menu 332D expands to display a plurality of audio properties sub-menus 333A-333B. The audio properties sub-menus 333A-333B include a reflect/transmit/absorb sub-menu 333A including reflect/transmit/absorb manipulation affordances for changing how real audio and/or virtual audio is reflected, transmitted, or absorbed by the selected object. In various implementations, the reflection, transmission, or absorption is manipulable in a frequency-dependent manner. Thus, in various implementations, as an example, a virtual wall can be configured to reflect a certain percentage of sound and transmit lower frequencies more than higher frequencies.

The audio properties sub-menus 333A-333B include an emit sub-menu 333B including object setting manipulation affordances for changing audio emission properties of the currently selected object as described in detail below.

FIG. 3C illustrates a user input 399C directed to the emit sub-menu 333B. In various implementations, the user input 399C is input by a user tapping a finger or stylus on a touch-sensitive display at the location of the emit sub-menu 333B. In various implementations, the user input 399C is input by a user clicking a mouse button while a cursor is displayed at the location of the emit sub-menu 333B.

Figure 3D:
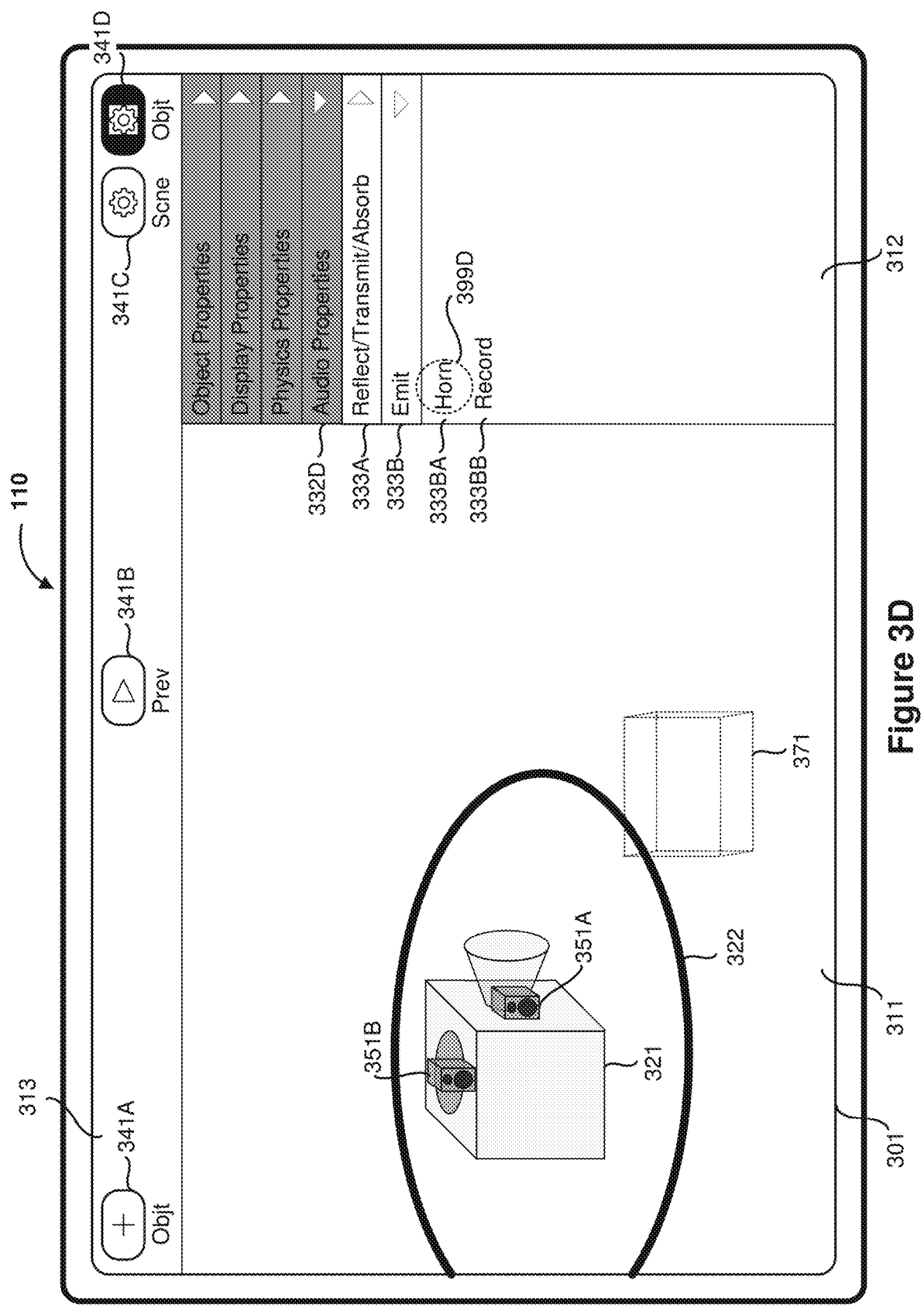

FIG. 3D illustrates the GUI 301 of FIG. 3C in response to detecting the user input 399C directed to the emit sub-menu 333B. In response to detecting the user input 399C directed to the emit sub-menu 333B, the emit sub-menu 333B expands to display a plurality of audio emitter indicators 333BA-333BB. The plurality of audio emitter indicators 333BA affordances includes a first audio emitter indicator 333BA indicating the name (e.g., "Horn") of a first audio emitter associated with the selected object and a second audio emitter indicator 333BB indicating the name (e.g., "Record") of a second audio emitter associated with the selected object, which is the virtual record player in FIG. 3D.

The first audio emitter is represented by the representation of the first audio emitter 351A in the view region 311 and the second audio emitter is represented by the representation of the second audio emitter 351B in the view region.

FIG. 3D illustrates a user input 399D directed to the first audio emitter indicator 333BA. In various implementations, the user input 399D is input by a user tapping a finger or stylus on a touch-sensitive display at the location of the first audio emitter indicator 333BA. In various implementations, the user input 399D is input by a user clicking a mouse button while a cursor is displayed at the location of the first audio emitter indicator 333BA.

Figure 3E:
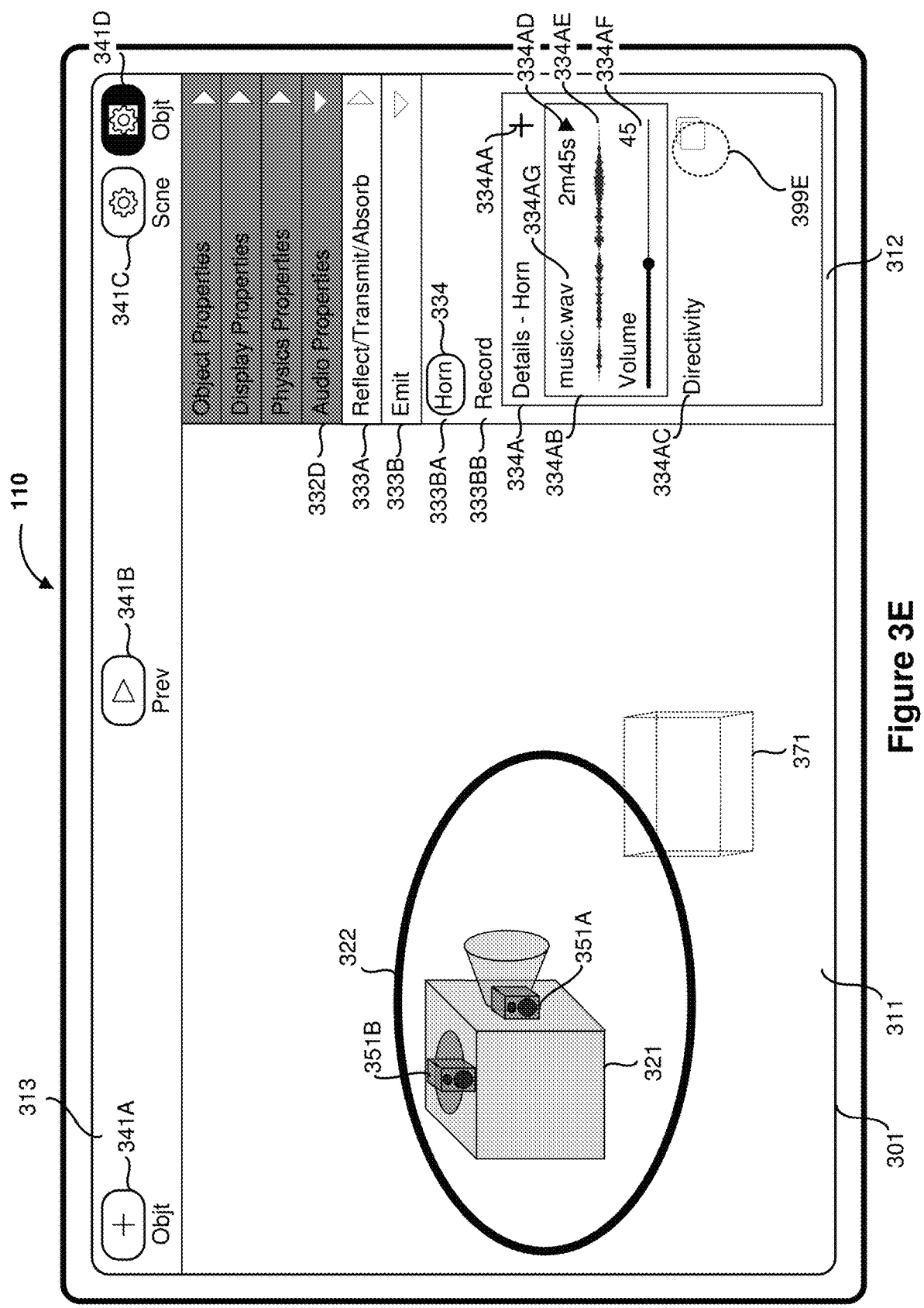

FIG. 3E illustrates the GUI 301 of FIG. 3D in response to detecting the user input 399D directed to the first audio emitter indicator 333BA. In various implementations, FIG. 3E illustrates the GUI 301 in response to detecting a user input directed to the representation of the first audio emitter 351A in the view region 311.

In response to detecting the user input 399D directed to the first audio emitter indicator 333BA, the selection indicator 322 is displayed around the representation of the first audio emitter 351A indicating that the first audio emitter is selected. Further, in response to selection of the first audio emitter, the emit sub-menu 333B includes a details window 334A including audio property manipulation affordances for manipulating audio properties of the first audio emitter.

The details window 334A includes an add-clip affordance 334AA for associating an audio file with the first audio emitter. When an XR environment including the scene is displayed, e.g., in response to a user input interacting with the preview affordance 341B, the audio files associated with the first audio emitter are played in accordance with the values of the audio properties of the first audio emitter.

The details window 334A includes a clip box 334AB for manipulating audio properties associated with a first audio file previously associated with the first audio emitter. In various implementations, the details box 334A includes multiple clip boxes if multiple audio files are associated with the first audio emitter.

The clip box 334AB includes a file affordance 334AG for changing the first audio file to a second audio file. The file affordance 334AG indicates the name of the first audio file, which is "music.wav" in FIG. 3E. The clip box 334AB includes a preview affordance 334AD for playing a preview of the first audio file. The preview affordance 334AD indicates a temporal length of the first audio file. The clip box 334AB includes a waveform 334AE that provides a visual representation of the waveform of the first audio file. The clip box 334AB includes a volume affordance 334AF for changing a volume of the first audio file.

The details window 334A includes a directivity affordance 334AC for manipulating directional audio properties of the first audio emitter as will be described in detail below.

FIG. 3E illustrates a user input 399E directed to the directivity affordance 334AC. In various implementations, the user input 399E is input by a user tapping a finger or stylus on a touch-sensitive display at the location of the directivity affordance 334AC. In various implementations, the user input 399E is input by a user clicking a mouse button while a cursor is displayed at the location of the directivity affordance 334AC.

Figure 3F:
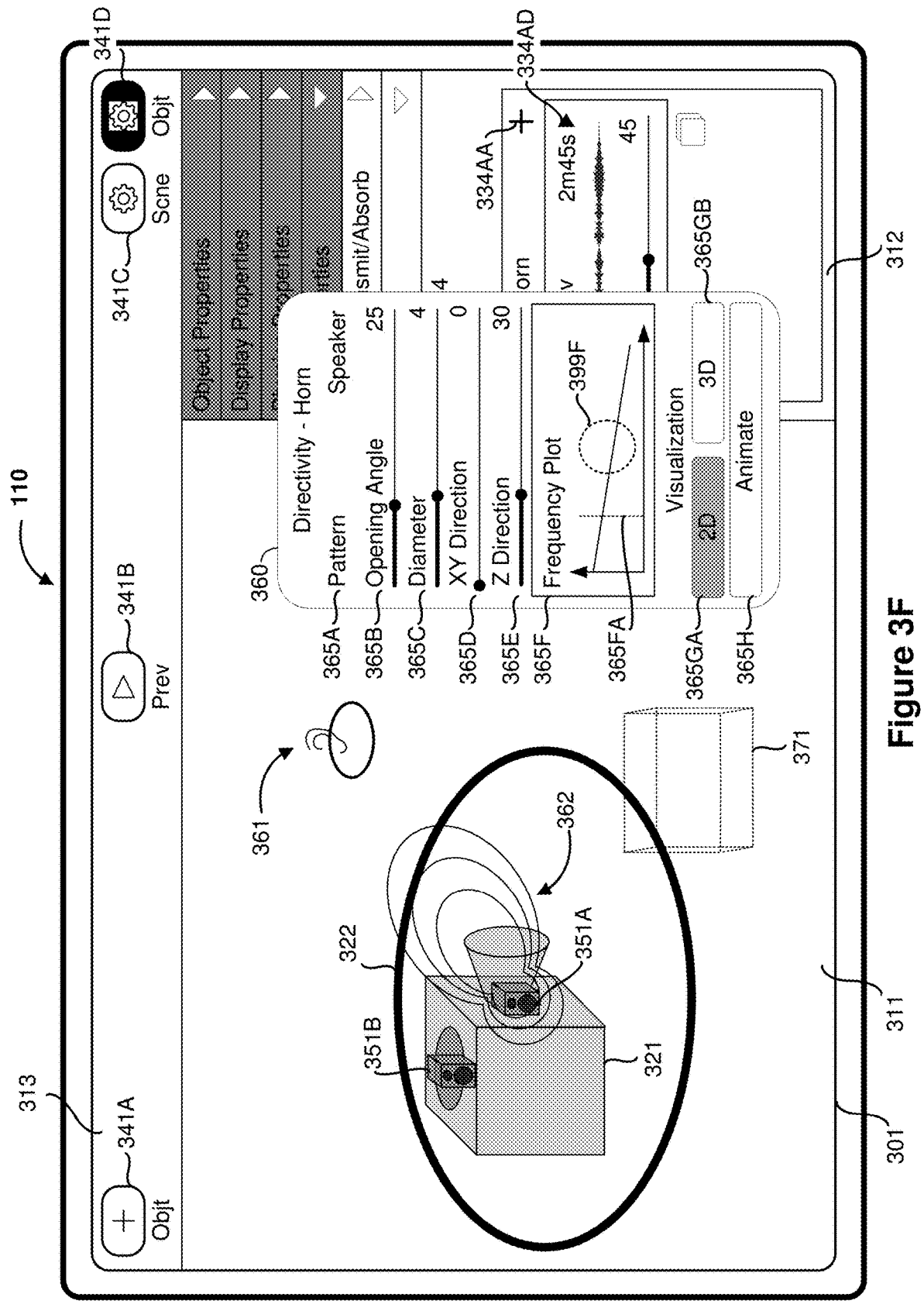

FIG. 3F illustrates the GUI 301 of FIG. 3E in response to detecting the user input 399E directed to the directivity affordance 334AC. In response to detecting the user input 399E directed to the directivity affordance 334AC, the GUI 301 includes a directivity window 360 including affordances for manipulating directional audio properties of the first audio emitter.

While the directivity window 360 is displayed, the GUI 301 includes a listener location representation 361 in the view region 311. The listener location representation 361 is located at a listener location in the representation of the scene. Further, via user input, a user can change the listener location by moving the listener location representation 361 in the representation of the scene. In various implementations, the frequency plot 365F of the directivity window 360, as described below, illustrates the frequency-dependent volume based on the position and/or orientation of the listener location with respect to the first audio emitter. In various implementations, upon receiving a selection of the preview affordance 334AD or other user input, the electronic device 110 plays the audio files associated with the first audio emitter at a frequency-dependent volume based on the position and/or orientation of the listener location with respect to the first audio emitter.

In various implementations, no listener location representation 361 is displayed and the listener location is the same as the view location from which the representation of the scene is displayed.

While the directivity window 360 is displayed with the 2D visualization affordance 365GA selected, as described further below, the GUI 301 includes a two-dimensional directivity visualization 362 displayed in association with the first audio emitter 351A. The two-dimensional directivity visualization 362 includes a plurality of slices surrounding the first audio emitter 351A. Each slice represents a plurality of locations in the three-dimensional coordinate system of the scene on a visualization plane at which the volume of the audio emission pattern at a particular frequency is equal. Each slice represents a different volume. For example, in various implementations, the slices represent 75%, 50%, and 25% of the maximum volume. In various implementations, the different slices are displayed differently, such as a different color, brightness, or width, to indicate the different volumes.

In various implementations, the plane is perpendicular to the view location. In various implementations, the plane is based on an orientation of the object. Thus, in various implementations, rotating the object rotates the plane. In various implementations, the particular frequency is a selected frequency indicated in the frequency plot 365F by a frequency indicator 365FA.

As noted above, the directivity window 360 includes affordances for manipulating directional audio properties of the first audio emitter. In various implementations, the first audio emitter is associated with an audio emission pattern, which may also be referred to as a directivity pattern, radiation pattern, or sound emission pattern. The audio emission pattern defines the relative volume of audio at various distances and angles from the first audio emitter. In various implementations, the audio emission pattern is a three-dimensional audio emission pattern which defines a relative volume at each distance, first angle, and second angle perpendicular to the first angle from the first audio emitter.

The directivity window includes an opening angle affordance 365B for changing an opening angle property of the first audio emitter and a diameter affordance 365C for changing a diameter property of the first audio emitter. In various implementations, the audio emission pattern is based on a spherical-cap model in which audio is emitted by a vibrating spherical cap, e.g., the contact-lens-shaped portion of a sphere cut by a plane, on a rigid spherical baffle. The spherical cap is defined by two values, a diameter of the sphere and the amount of sphere that forms the cap, defined by an opening angle.

In various implementations, the opening angle property of the first audio emitter is related to the opening angle and the diameter property of the first audio emitter is related to the diameter.

In various implementations, decreasing the opening angle property increases the directivity of the first audio emitter such that the volume drops off more sharply with increasing angle between the audio emission line and the relative position line. In various implementations, the opening angle property is replaced with a focus property in which increasing the focus property increases the directivity of the first audio emitter.

In various implementations, increasing the diameter increases the frequency-dependent directivity of the first audio emitter such that the volume of higher frequencies drops off more sharply than the volume of lower frequencies with increasing angle between the audio emission line and the relative position line. Examples are illustrated in the Figures below.

The directivity window 360 includes a preset affordance 365A for selecting a preset template for the values of the opening angle property and the diameter property. In various implementations, the preset templates include pairs of values corresponding to a speaker, a subwoofer, a musical instrument, or a human head.

The directivity window 360 includes an XY direction affordance 365D for changing an XY direction associated with the first audio emitter. The directivity window 360 includes a Z direction affordance 365E for changing a Z direction associated with the first audio emitter. The value of the XY direction audio property and the value of the Z direction audio property define the direction of the audio emission line of the first audio emitter. The value of the XY direction audio property defines the direction of the audio emission line in the XY plane. In various implementations, the XY direction audio property defines the direction of the audio emission line in the XY plane as an angle from due east in the three-dimensional coordinate system of the scene. The value of the Z direction audio property defines the direction of the audio emission line away from the XY plane. In various implementations, the value of the Z direction audio property defines the direction of the audio emission line away from the XY plane as an angle from the XY plane.

As noted above, the directivity window 360 includes a frequency plot 365F illustrates the frequency-dependent volume based on the position and/or orientation of the listener location with respect to the first audio emitter. The frequency plot 365F includes a frequency indicator 365FA that indicates the frequency represented by the two-dimensional directivity visualization 362 and/or the three-dimensional directivity visualization 363, described further below. In FIG. 3F, the frequency indicator 365FA is displayed a location indicating a first frequency.

The directivity window 360 includes a visualization toggle including a 2D visualization affordance 365GA and a 3D visualization affordance 365 GB. In various implementations, selection of the 3D visualization affordance 365 GB deselects the 2D visualization affordance and selection of the 2D visualization affordance 365GA deselects the 3D visualization affordance. In various implementations, while the 2D visualization affordance 365GA is selected, the view region 311 includes the two-dimensional directivity visualization 362 and while the 3D visualization affordance 365 GB is selected, the view region 311 includes the three-dimensional directivity visualization, described further below.

The directivity window 360 includes an animate affordance 365H for displaying an animation of audio propagation in the scene. In various implementations, the animation includes a sound cloud for which the brightness of each location generally corresponds to a volume at the location in the scene.

FIG. 3F illustrates a user input 399F directed to the location of the frequency plot 365F indicative of a second frequency. In various implementations, the user input 399F is input by a user tapping a finger or stylus on a touch-sensitive display at the location of the frequency plot 365F. In various implementations, the user input 399F is input by a user clicking a mouse button while a cursor is displayed at the location of the frequency plot 365F.

Figure 3G:
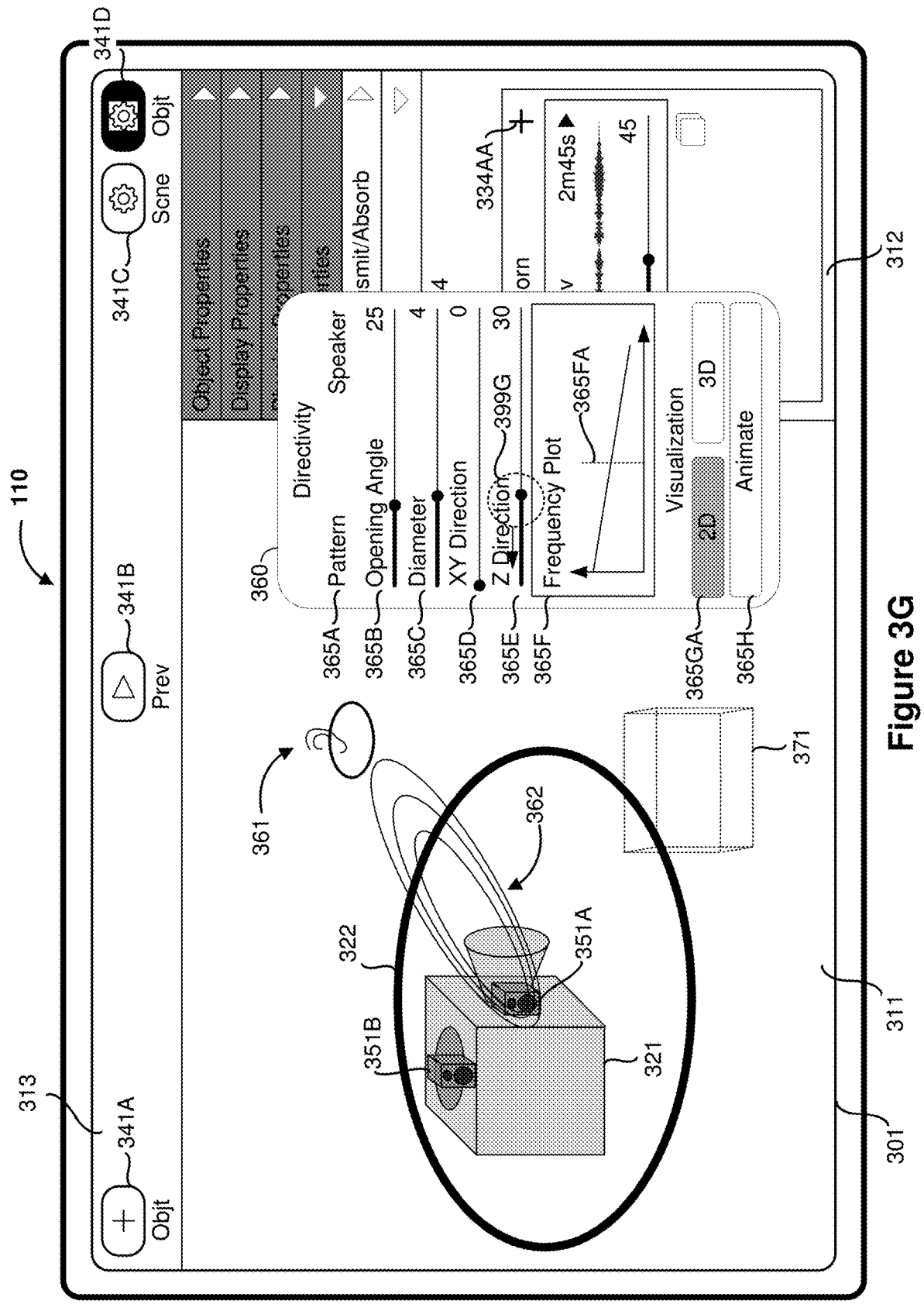

FIG. 3G illustrates the GUI 301 of FIG. 3F in response to detecting the user input 399F directed to the frequency plot 365F. In response to detecting the user input 399F directed to the frequency plot 365F, the frequency indicator 365FA is displayed at a location indicative of the second frequency, which is higher than the first frequency.

Further, due to the change in the selected frequency indicated in the frequency plot 365F by the frequency indicator 365FA, the two-dimensional directivity visualization 362 illustrates the audio emission pattern at the second frequency. Because the second frequency is higher than the first frequency, the audio emission pattern at the second frequency has a smaller beam width (e.g., is narrower) than the audio emission pattern at the first frequency.

FIG. 3G illustrates a user input 399G directed to the Z direction affordance 365E. In various implementations, the user input 399G is input by a user dragging a finger or stylus across a touch-sensitive display from a first location of the Z direction affordance 365E to a second location to the left of the first location. In various implementations, the user input 399G is input by a user holding down a mouse button while moving a cursor displayed at the first location of the Z direction affordance 365E to the second location.

Figure 3H:
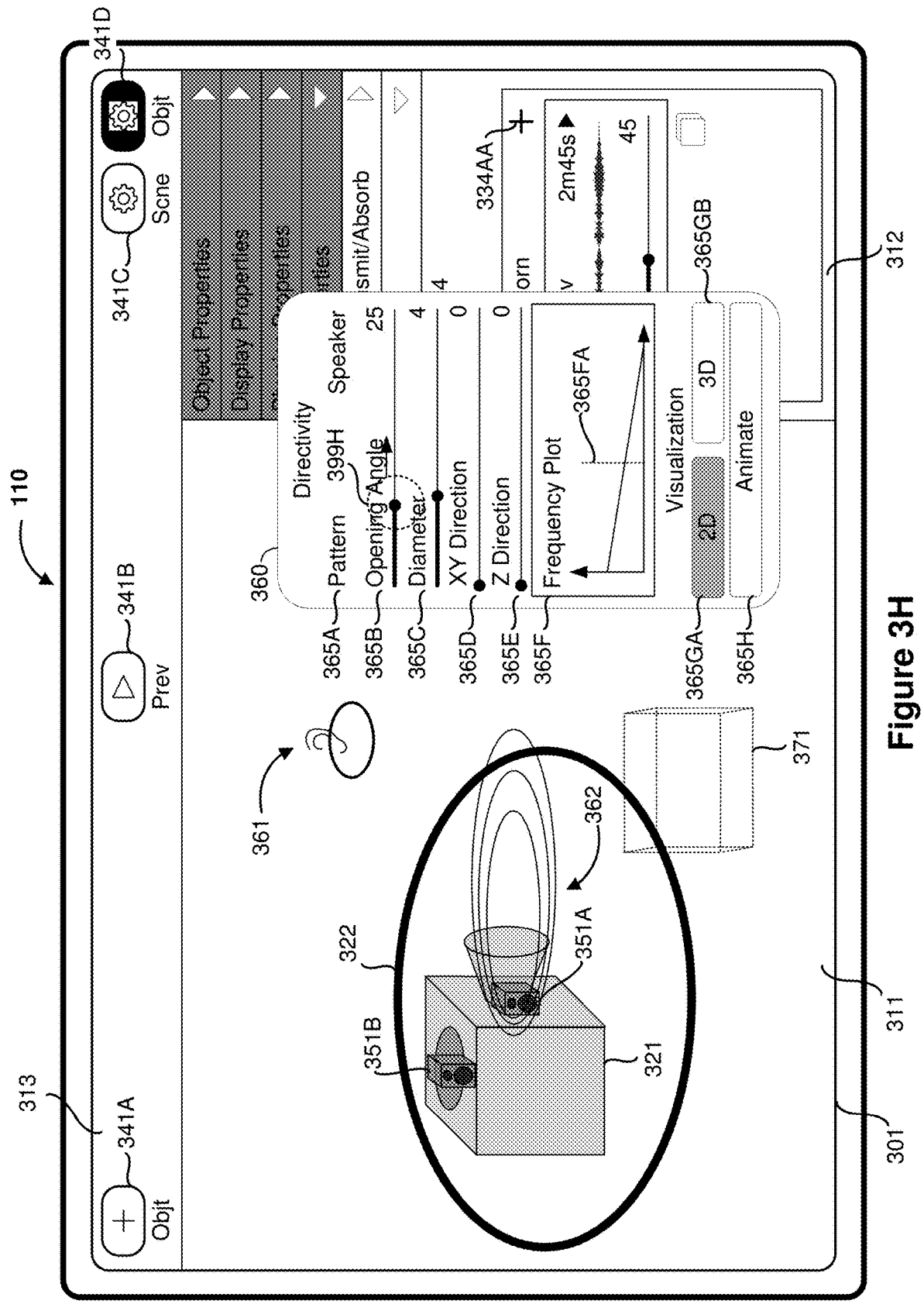

FIG. 3H illustrates the GUI 301 of FIG. 3G in response to detecting the user input 399G directed to the Z direction affordance 365E. In response to detecting the user input 399G directed to the Z direction affordance 365E, the Z direction of the audio emission line of the first audio emitter is changed from 30 degrees to 0 degrees, as indicated by the Z direction affordance 365E. Further, the two-dimensional directivity visualization 362 is changed to illustrate the change in the audio emission line. Because the change in the audio emission line increases the angle between the audio emission line of the first audio emitter and the relative position line between the location of the first audio emitter and the listener location, the frequency plot 365F illustrates that the frequency-dependent volume at the listener location has decreased across all frequencies, more so at higher frequencies than lower frequencies.

FIG. 3H illustrates a user input 399H directed to the opening angle affordance 365B. In various implementations, the user input 399H is input by a user dragging a finger or stylus across a touch-sensitive display from a first location of the opening angle affordance 365B to a second location to the right of the first location. In various implementations, the user input 399H is input by a user holding down a mouse button while moving a cursor displayed at the first location of the opening angle affordance 365B to the second location.

Figure 3I:
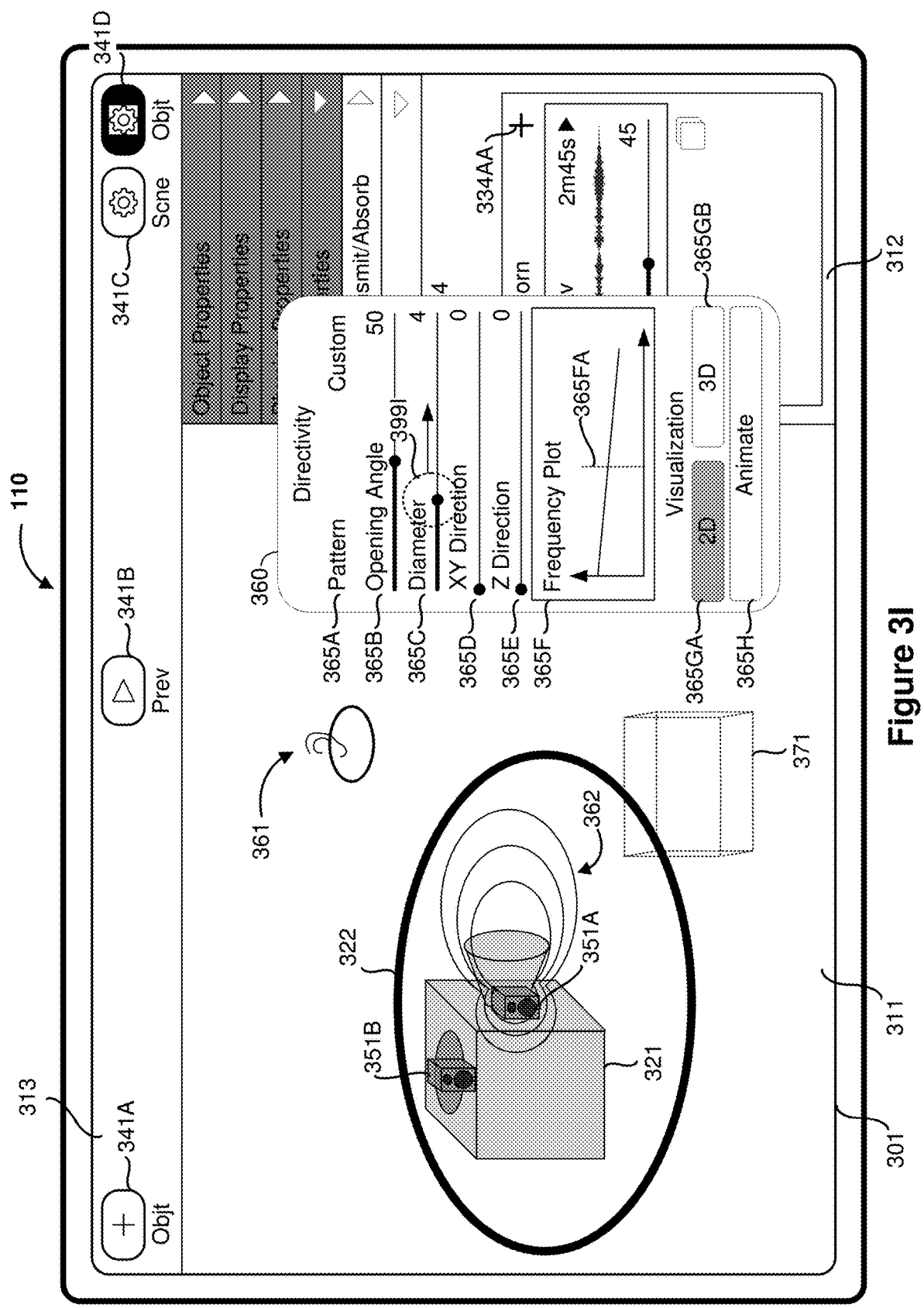

FIG. 3I illustrates the GUI 301 of FIG. 3H in response to detecting the user input 399H directed to the opening angle affordance 365B. In response to detecting the user input 399H directed to the opening angle affordance 365B, the value of the opening angle property of the first audio emitter is changed from 25 degrees to 50 degrees, as indicated by the opening angle affordance 365B. Further, the two-dimensional directivity visualization 362 is changed to illustrate the change in the opening angle property, where the audio emission pattern has an increased beam width (e.g., is wider) as compared the audio emission pattern in FIG. 3H. Based on the change in the audio emission pattern, the frequency plot 365F illustrates that the frequency-dependent volume at the listener location has increased across all frequencies, more so at higher frequencies than lower frequencies.

In FIG. 3I, the preset affordance 365A is changed from "Speaker" to "Custom" to indicate that the opening angle property and diameter property do not match one of the preset templates.

FIG. 3I illustrates a user input 399I directed to the diameter affordance 365C. In various implementations, the user input 399I is input by a user dragging a finger or stylus across a touch-sensitive display from a first location of the diameter affordance 365C to a second location to the right of the first location. In various implementations, the user input 399I is input by a user holding down a mouse button while moving a cursor displayed at the first location of the diameter affordance 365C to the second location.

Figure 3J:
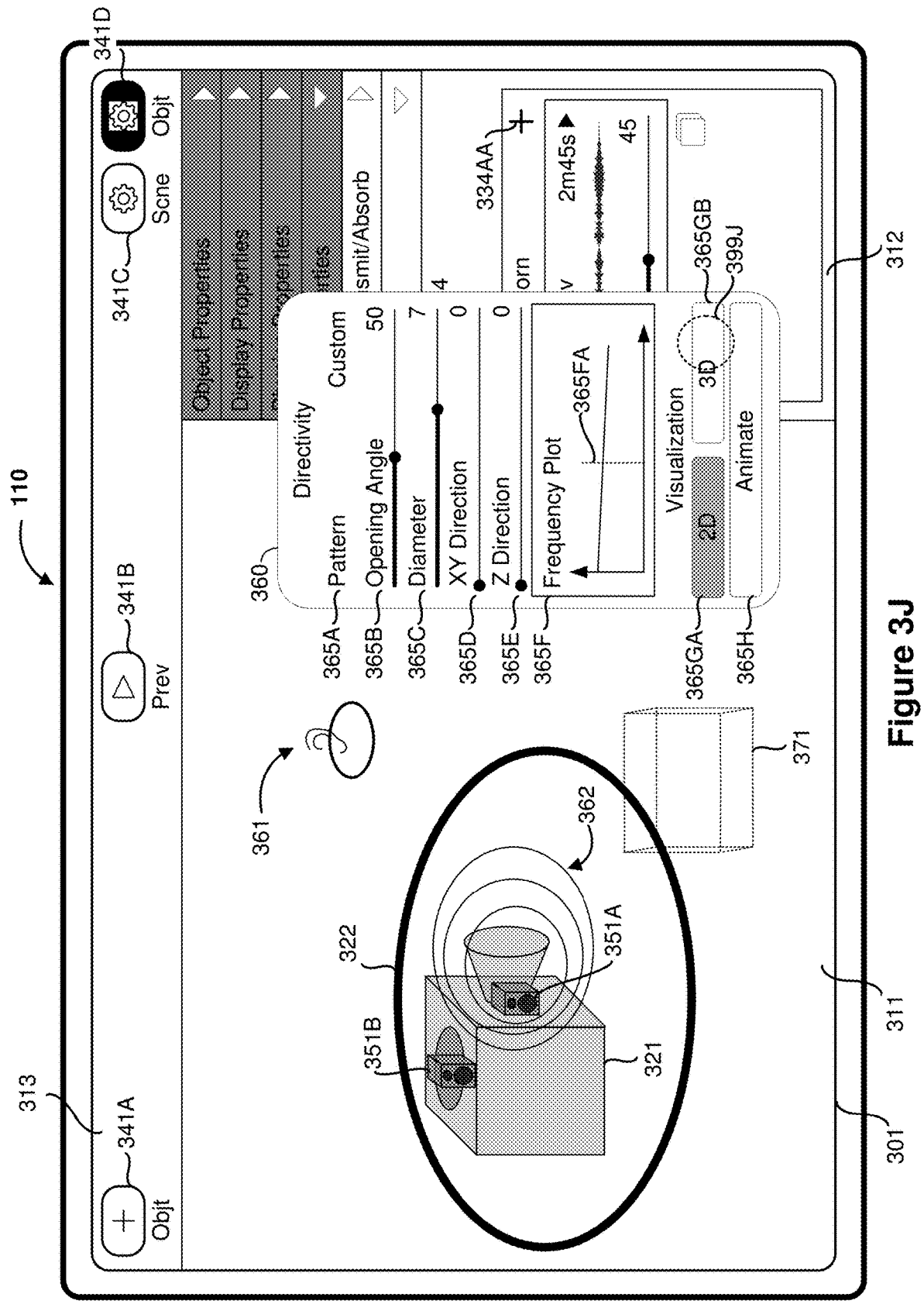

FIG. 3J illustrates the GUI 301 of FIG. 3I in response to detecting the user input 399I directed to the diameter affordance 365C. In response to detecting the user input 399I directed to the diameter affordance 365C, the value of the diameter property of the first audio emitter is changed from 4 to 7 degrees, as indicated by the diameter affordance 365B. In various implementations, the two-dimensional directivity visualization 362 is changed to illustrate the change in the diameter property, where the audio emission pattern has an increased beam width (e.g., is wider) as compared the audio emission pattern in FIG. 3I. Based on the change in the audio emission pattern, the frequency plot 365F illustrates that the frequency-dependent volume at the listener location has flattened, decreasing the difference in volume between lower frequencies and higher frequencies.

In various implementations, increasing the diameter property increases the beam width of the audio emission pattern at higher frequencies. In various implementations, increasing the diameter property decreases the beam width of the audio emission pattern at lower frequencies. In various implementations, increasing the diameter property does not affect the beam width of the audio emission pattern at lower frequencies. In various implementations, increasing the diameter property increases the beam width of the audio emission pattern at lower frequencies, but not as much as the increase in beam width of the audio emission pattern at higher frequencies.

Thus, in various implementations, decreasing the opening angle parameter decreases the volume across all frequencies at locations off the audio emission line, more so at higher frequencies than lower frequencies, and increasing the diameter parameter decreases this frequency-dependent effect.

FIG. 3J illustrates a user input 399J directed to the 3D visualization affordance 365 GB. In various implementations, the user input 399J is input by a user tapping a finger or stylus on a touch-sensitive display at the location of the 3D visualization affordance 365 GB. In various implementations, the user input 399J is input by a user clicking a mouse button while a cursor is displayed at the location of the 3D visualization affordance 365 GB.

Figure 3K:
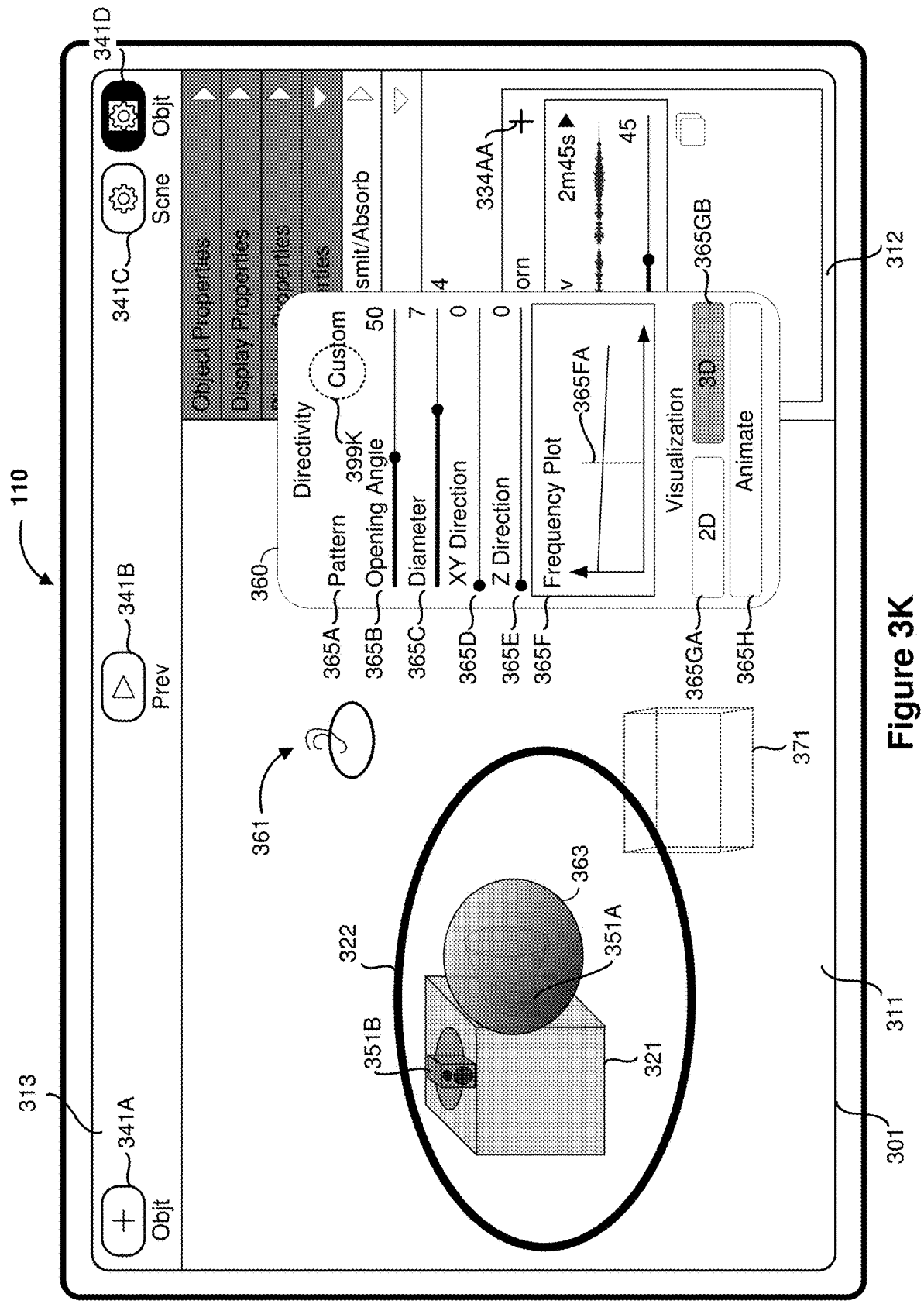

FIG. 3K illustrates the GUI 301 of FIG. 3J in response to detecting the user input 399J directed to the 3D visualization affordance 365 GB. In response to detecting the user input 399J directed to the 3D visualization affordance 365 GB, the 3D visualization affordance 365 GB is selected and the 2D visualization affordance 365GA is deselected. In response to the deselection of the 2D visualization affordance 365GA, the two-dimensional directivity visualization 362 is no longer displayed. In response to the selection of the 3D visualization affordance 365 GB, a three-dimensional directivity visualization 363 is displayed in association with the representation of the first audio emitter 351A.

The three-dimensional directivity visualization 363 includes a three-dimensional object representing a plurality of locations in the three-dimensional coordinate system of the scene at which the volume of the audio emission pattern at a particular frequency is equal. In various implementations, the particular frequency is the selected frequency indicated in the frequency plot 365F by the frequency indicator 365FA. In various implementations, the three-dimensional directivity visualization 363 is at least partially transparent.

FIG. 3K illustrates a user input 399K directed to the preset affordance 365A. In various implementations, the user input 399K is input by a user tapping a finger or stylus on a touch-sensitive display at the location of the preset affordance 365A. In various implementations, the user input 399K is input by a user clicking a mouse button while a cursor is displayed at the location of the preset affordance 365A.

Figure 3L:
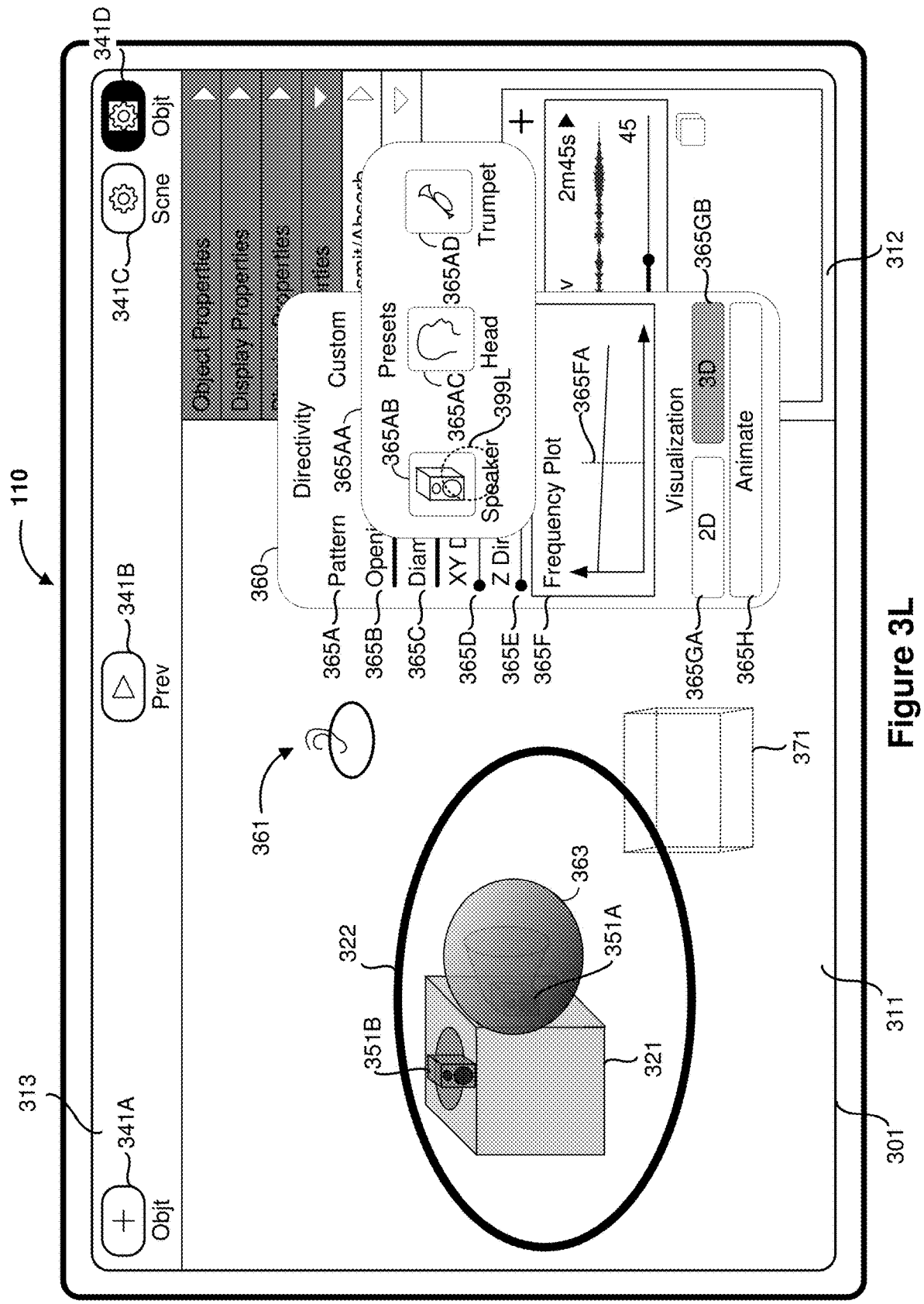

FIG. 3L illustrates the GUI 301 of FIG. 3K in response to detecting the user input 399K directed to the preset affordance 365A. In response to detecting the user input 399K directed to the preset affordance 365A, the GUI 301 includes a preset pop-up 365AA including a plurality of preset selection affordances 365AB-365AD for selecting a preset template. The preset pop-up includes a speaker selection affordance 365AB for setting the opening angle property and diameter property of the first audio emitter to values associated with a speaker. The preset pop-up includes a head selection affordance 365AC for setting the opening angle property and diameter property of the first audio emitter to values associated with a human head. The preset pop-up includes a trumpet selection affordance 365AD for setting the opening angle property and diameter property of the first audio emitter to values associated with a trumpet.

FIG. 3L illustrates a user input 399L directed to the speaker selection affordance 365AB. In various implementations, the user input 399L is input by a user tapping a finger or stylus on a touch-sensitive display at the location of the speaker selection affordance 365AB. In various implementations, the user input 399L is input by a user clicking a mouse button while a cursor is displayed at the location of the speaker selection affordance 365AB.

Figure 3M:
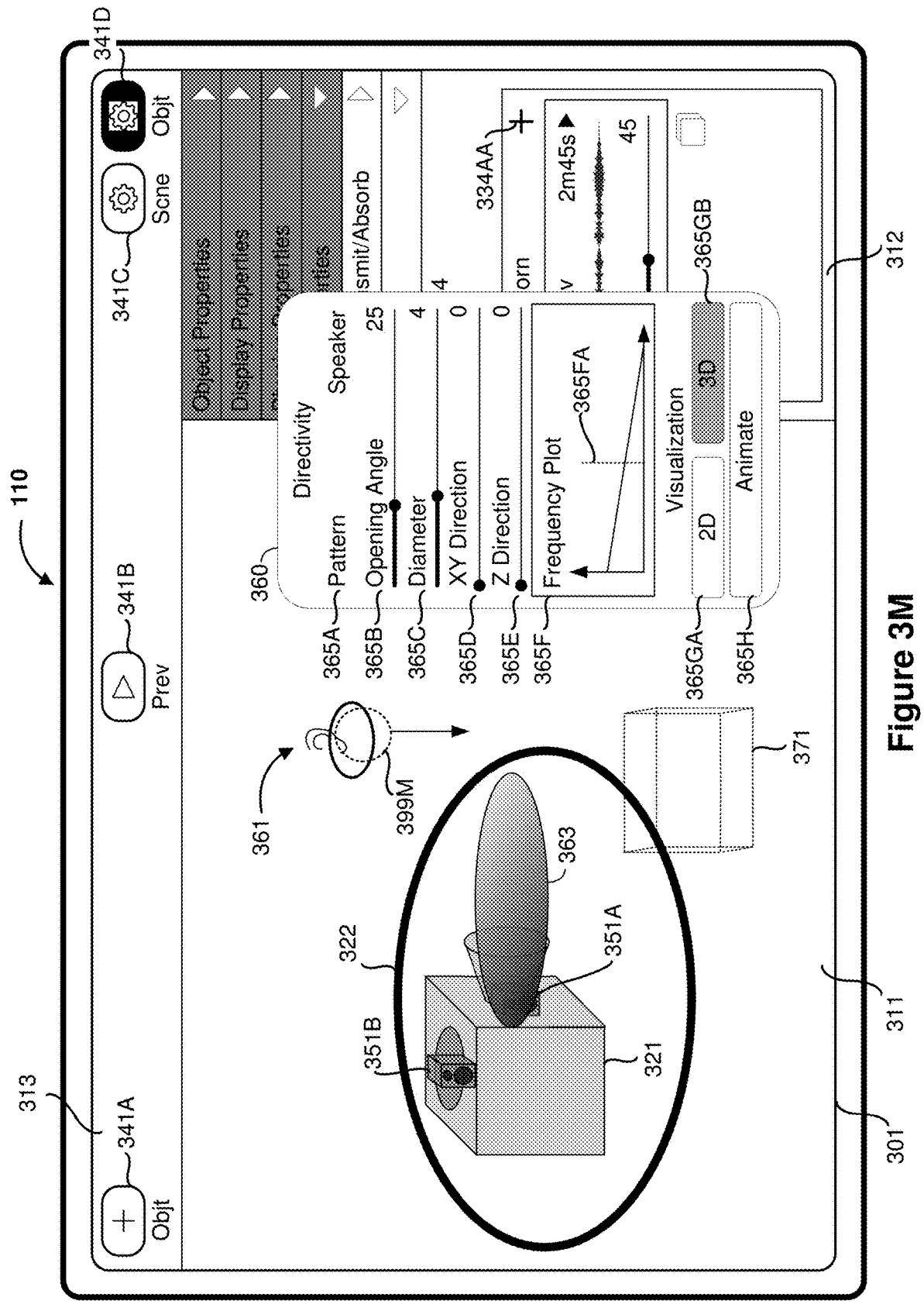

FIG. 3M illustrates the GUI 301 of FIG. 3L in response to detecting the user input 399L directed to the speaker selection affordance 365AB. In response to detecting the user input 399L directed to the speaker selection affordance 365AB, the preset pop-up 365AA ceases to be displayed and the preset affordance 365A indicates that the opening angle property and the diameter property of the first audio emitter is set to values associated with a speaker. For example, the opening angle property of the first audio emitter is set to 25 as indicated by the opening angle affordance 365B and the diameter property of the first audio emitter is set to 4 as indicated by the diameter affordance 365C. Further, based on the change to the opening angle property and the diameter property, the three-dimensional directivity visualization 363 is changed. In particular, the audio emission pattern has a smaller beam width (e.g., is narrower) than the audio emission pattern in FIG. 3L. Similarly, based on the change to the opening angle property and the diameter property, the frequency plot 365F indicates that the frequency-dependent volume has decreased across all frequencies, more so at higher frequencies than lower frequencies.

FIG. 3M illustrates a user input 399M directed to the listener location representation 361. In various implementations, the user input 399M is input by a user dragging a finger or stylus across a touch-sensitive display from the location of the listener location representation to a new location in the three-dimensional coordinate system of the scene. In various implementations, the user input 399M is input by a user holding down a mouse button while moving a cursor displayed at the location of the listener location representation to the new location.

Figure 3N:
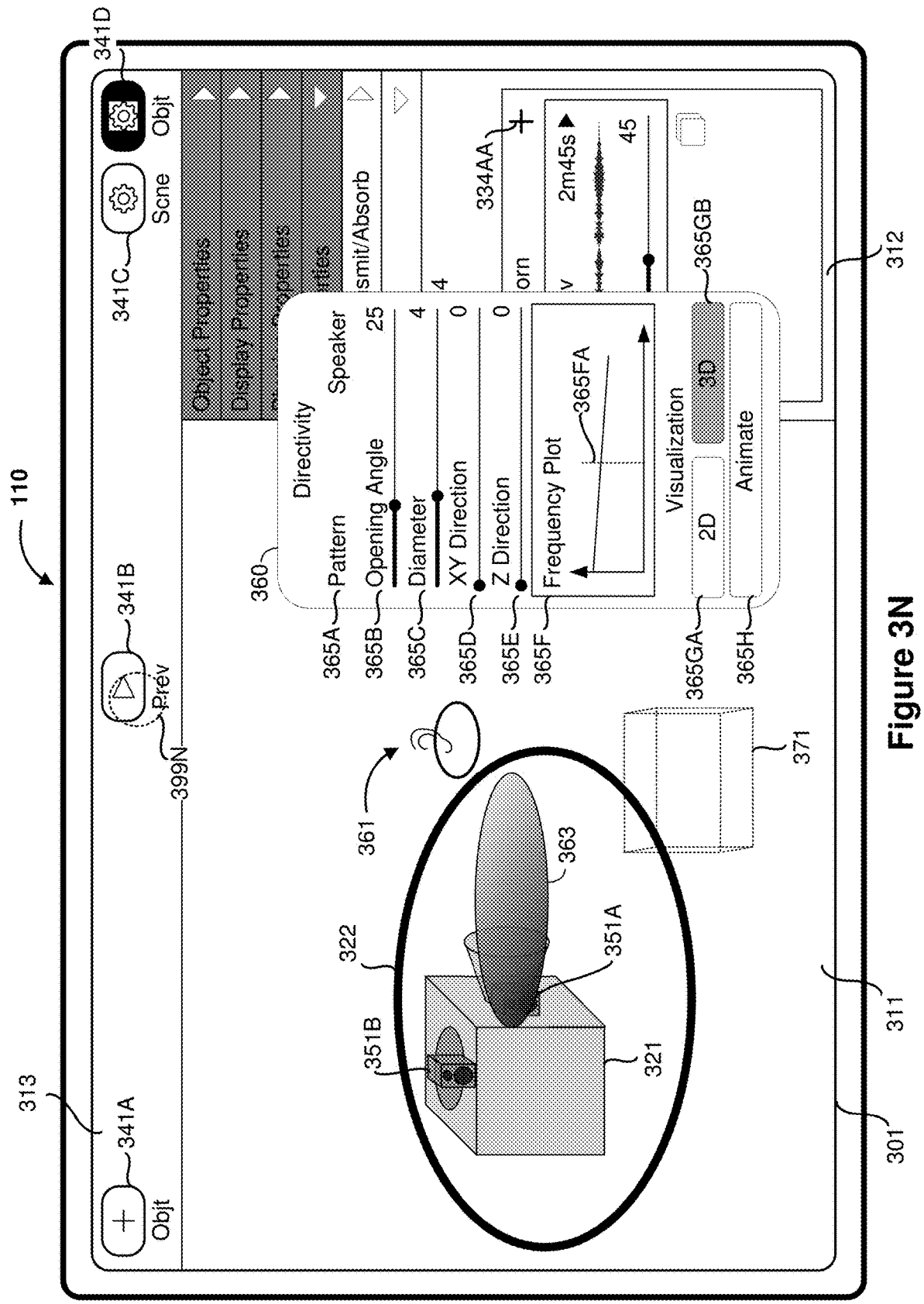

FIG. 3N illustrates the GUI 301 of FIG. 3M in response to detecting the user input 399M directed to the listener location representation 361. In response to detecting the user input 399M directed to the listener location representation 361, the listener location representation 361 is displayed in a new location in the view area 311 associated with a new listener location. Further, based on the change to the listener location, the frequency plot 365F indicates that the frequency-dependent volume has increased across all frequencies, more so at higher frequencies than lower frequencies.

FIG. 3N illustrates a user input 399N directed to the preview affordance 341B. In various implementations, the user input 399N is input by a user tapping a finger or stylus across a touch-sensitive display at the location of the preview affordance 341B. In various implementations, the user input 399N is input by a user clicking a mouse button while a cursor displayed at the location of the preview affordance 341B.

Figure 3O:
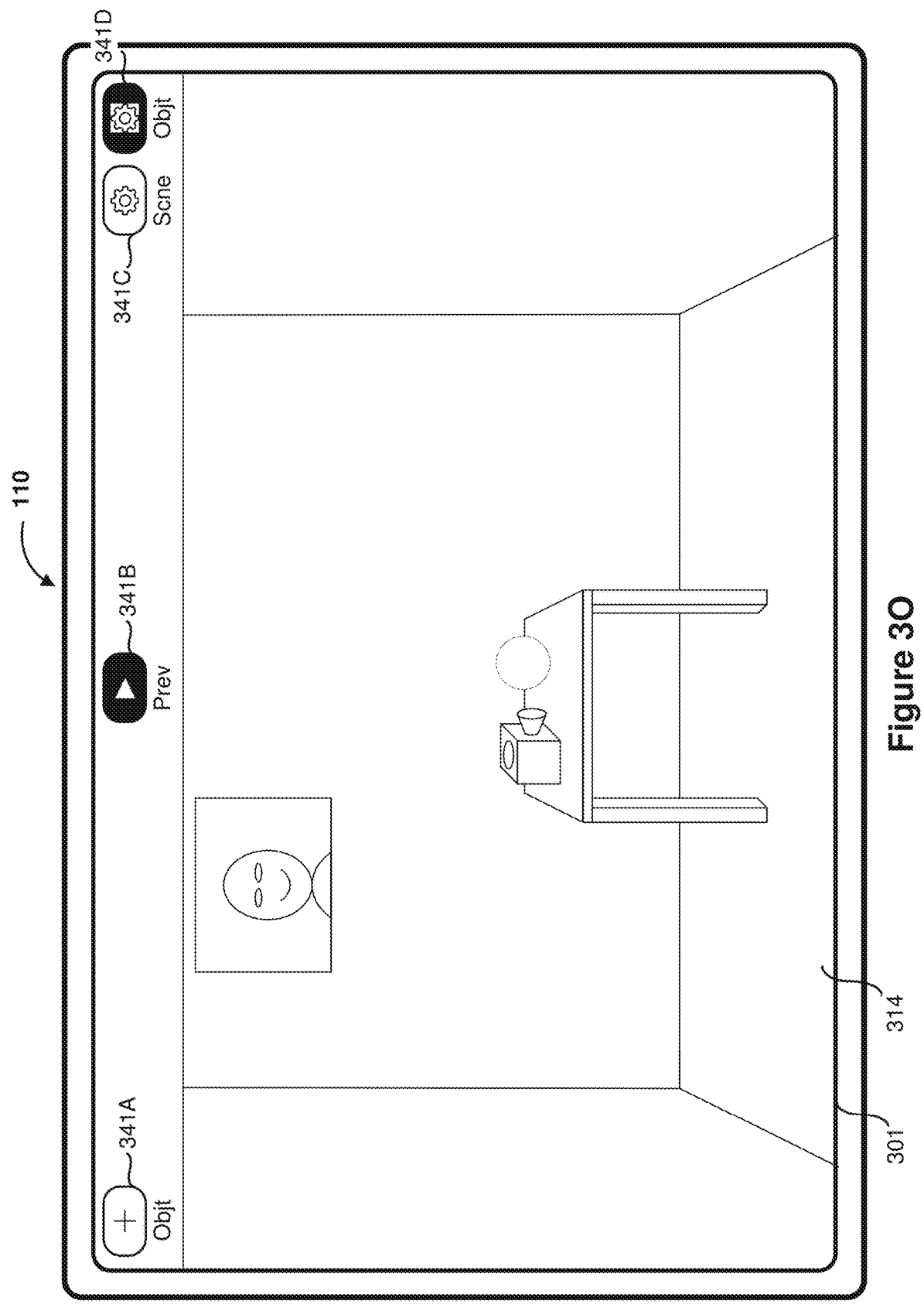

FIG. 3O illustrates the GUI 301 of FIG. 3N in response to detecting the user input 399N directed to the preview affordance 341B. In response to detecting the user input 399N directed to the preview affordance 341B, the preview affordance 341B is displayed in a different manner and the view region 311 and the settings region 312 are replaced with a preview region 314. In the preview region 314, an XR environment including the scene is displayed. Further, the various audio files associated with the various audio emitters are played in accordance with the values of their audio properties.

The scene includes a variety of different audio emitters. The first audio emitter and second audio emitter associated with the virtual record player are spatial audio emitters that emit audio from an object location in the three-dimensional coordinate system. Accordingly, the volume at which the associated audio files is played is dependent on the user location, e.g., the distance between the user location and the object location and/or the orientation between the user location and the object location. The first audio emitter associated with the virtual record player emits audio from an object location in an audio emission direction. The second audio emitter associated with the virtual record player emits audio omnidirectionally.

A first audio emitter associated with the invisible object is a directional audio emitter which emits audio from an audio reception direction. Accordingly, the volume at which the associated audio file is played is independent of the user location. However, the audio is received from a particular direction in the three-dimensional coordinate system (e.g., due east) of the XR environment.

A second audio emitter associated with the invisible object is an ambient audio emitter which emits ambient audio. The volume at which the associated audio file is played is independent of the user location and the user orientation.

FIG. 4 is a flowchart representation of a method 400 of playing audio in accordance with some implementations. In various implementations, the method 400 is performed by a device with a display, one or more speakers, one or more processors, and non-transitory memory. In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device displaying, using the display, an environment from the perspective of a user location, wherein the environment includes an object located at an object location in the environment, oriented at an object orientation with respect to the user location, and associated with a frequency-dependent three-dimensional audio emission pattern. For example, in FIG. 2A, the electronic device 110 displays the first image 211A including the audio emitter object 219. As another example, in FIG. 3O, the electronic device 110 displays the preview region 314 including an XR environment including a scene with the virtual record player associated with a first audio emitter and a second audio emitter.

In various implementations, the environment is a virtual environment and the object is a virtual object. In various implementations, the environment is a mixed reality environment and the object is a virtual object. In various implementations, the environment is a mixed reality environment and the object is a real object. In various implementations, the user location is the location of a camera of the device. In various implementations, the user location is the location of a user of the device. In various implementations, the user location is the location of an avatar of the user.

In various implementations, the method 400 further includes displaying a displayed object and the object is an audio emitter associated with the displayed object. For example, in FIG. 2A, the electronic device displays the first image 211A including the virtual object 119 with which the audio emitter object 219 is associated. As another example, in FIG. 3O, the electronic device 110 displays the preview region 314 including a representation of the virtual record player associated with a first audio emitter and a second audio emitter. In various implementations, at least one of the object location or object orientation is based on at least one of a location or orientation of the displayed object. For example, with respect to FIGS. 2C and 2D, when the virtual object 119 is rotated, the audio emitter object orientation is also changed. Thus, in various implementations, the audio emitter is fixed to the displayed object.

The method 400 continues, in block 420, with the device determining, based on a distance between the user location and the object location, the object orientation with respect to the user location, and the frequency-dependent three-dimensional audio emission pattern, a frequency-dependent volume for audio associated with the object. In various implementations, the audio is represented and/or stored as an audio file.

In various implementations, determining the frequency-dependent volume includes determining a first volume at a first frequency based on the frequency-dependent three-dimensional audio emission pattern at the first frequency and determining a second volume at a second frequency based on the frequency-dependent three-dimensional audio emission pattern at the second frequency. In various implementations, the first frequency is less than the second frequency and the first volume is greater than the second volume.

For example, in FIG. 2A, the electronic device 110 determines a first volume, V1, at a first frequency and the first volume, V1, at the second frequency for an audio file associated with the audio emitter object 219 when the object orientation with respect to the user location is a first value and, in FIG. 2B, the electronic device 110 determines a second volume, V2, at the first frequency and a third volume, V3, at the second frequency for the audio file when the object orientation with respect to the user location is a second value because the user location has changed. As another example, in FIG. 2C, the electronic device 110 determines a fourth volume, V4, at the first frequency and a fifth volume, V5, for the audio file when the object orientation is the second value and, in FIG. 2D, the electronic device 110 determines a sixth volume, V6, at the first frequency and a seventh volume, V7, at the second frequency for the audio file when the object orientation is a third value because the object has rotated.

In various implementations, the volume is based on a distance scale that maps distance to volume. In various implementations, the volume is a decreasing (but not necessarily strictly decreasing) function of the distance. For example, in various implementations, the volume is a maximum volume when the distance is less than a first threshold, strictly decreasing between the first threshold to a second threshold, and a minimum volume when the distance is greater than the second threshold.

The method 400 continues, in block 430, with the device playing, using the one or more speakers, the audio at the frequency-dependent volume. In various implementations, playing the audio at the frequency-dependent volume includes playing a first frequency of the audio at a first volume and playing a second frequency of the audio at a second volume. In various implementations, the first frequency is less than the second frequency and the first volume is greater than the second volume.

In various implementations, playing the audio includes playing the audio via the speaker and at least one additional speaker directionally from the object location. Thus, the audio may be perceived by a user as being emitted from the object location.

For example, in FIG. 2A, the electronic device 110 determines a first volume, V1, at a first frequency and the first volume, V1, at the second frequency for an audio file associated with the audio emitter object 219 when the object orientation with respect to the user location is a first value and, in FIG. 2B, the electronic device 110 determines a second volume, V2, at the first frequency and a third volume, V3, at the second frequency for the audio file when the object orientation with respect to the user location is a second value because the user location has changed. As another example, in FIG. 2C, the electronic device 110 determines a fourth volume, V4, at the first frequency and a fifth volume, V5, for the audio file when the object orientation is the second value and, in FIG. 2D, the electronic device 110 determines a sixth volume, V6, at the first frequency and a seventh volume, V7, at the second frequency for the audio file when the object orientation is a third value because the object has rotated.

FIG. 5 is a flowchart representation of a method 500 of displaying a visualization of an audio emission pattern in accordance with some implementations. In various implementations, the method 500 is performed by a device with a display, one or more input devices, one or more processors, and non-transitory memory. In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device displaying, using the display, a representation of a scene including a representation of an object associated with a three-dimensional audio emission pattern. For example, in FIG. 3C, the electronic device 110 displays a representation of a scene including a representation of the first audio emitter 351A.

The method 500 continues, in block 520, with the device determining a visualization type. For example, in FIG. 3F, the 2D visualization affordance 365GA is selected and the electronic device 110 determines a two-dimensional visualization type. As another example, in FIG. 3K, the 3D visualization affordance 365 GB is selected and the electronic device 110 determines a three-dimensional visualization type. In various implementations, the device determines the visualization type based on user input selecting a visualization type. For example, in FIG. 3J, the electronic device 110 detects the user input 399J selecting a three-dimensional visualization type.

The method 500 continues, in block 530, with the device displaying, using the display, a visualization of the three-dimensional audio emission pattern based on the visualization type. For example, in FIG. 3F, the electronic device 110 displays the two-dimensional directivity visualization 362. As another example, in FIG. 3J, the electronic device 110 displays the three-dimensional directivity visualization 363.

In various implementations, the three-dimensional audio emission pattern is dependent on frequency and wherein displaying the visualization of the three-dimensional audio emission pattern includes displaying the visualization of the three-dimensional audio emission pattern at a first frequency. For example, in FIG. 3F, the two-dimensional directivity visualization 362 is displayed at a first frequency indicated in the frequency plot 365F by the frequency indicator 365FA.

In various implementations, the method 500 includes receiving a user input selecting a second frequency and displaying a visualization of the three-dimensional audio emission pattern at the second frequency. For example, in FIG. 3F, the electronic device 110 detects the user input 399F selecting a second frequency and, in response in FIG. 3F, displays the two-dimensional directivity visualization 362 at the second frequency.

In various implementations, the visualization of the three-dimensional audio emission pattern is displayed at a location of the representation of the object associated with the three-dimensional audio emission pattern. For example, in FIG. 3F, the two-dimensional directivity visualization 362 is displayed at the location of the representation of the first audio emitter 351A. As another example, in FIG. 3K, the three-dimensional directivity visualization 363 is displayed at the location of the representation of the first audio emitter 351A.

In various implementations, the method 500 includes receiving a user input changing a directional audio property of the object associated with the three-dimensional audio emission pattern from a first value to a second value. The method 500 includes determining an updated three-dimensional audio emission pattern based on the second value and displaying a visualization of the updated three-dimensional audio emission pattern. For example, in FIG. 3H, the electronic device 110 detects the user input 399H changing the opening angle property of the first audio emitter from 25 to 50 and, in response, in FIG. 3I, displays an updated two-dimensional directivity visualization with a wider beam width.

In various implementations, determining the visualization type includes determining a two-dimensional visualization type and displaying the visualization of the three-dimensional audio emission pattern includes displaying a two-dimensional visualization of the three-dimensional audio emission pattern. For example, in FIG. 3F, the electronic device determines a two-dimensional visualization type because the 2D visualization affordance 365GA is selected and, in response, displays the two-dimensional directivity visualization 362.

In various implementations, displaying the two-dimensional visualization of the three-dimensional audio emission pattern includes displaying a plurality of slices, each of the plurality of slices representing a plurality of locations in a three-dimensional coordinate system of the scene on a visualization plane at which a volume of the audio emission pattern is equal. In various implementations, the representation of the scene is displayed from a view location in the three-dimensional coordinate system of the scene and the visualization plane is perpendicular to the view location.

In various implementations, determining the visualization type includes determining a three-dimensional visualization type and displaying the visualization of the three-dimensional audio emission pattern includes displaying a three-dimensional visualization of the three-dimensional audio emission pattern. For example, in FIG. 3K, the electronic device 110 determines a three-dimensional visualization type because the 3D visualization affordance 365 GB is selected and, in response, displays the three-dimensional directivity visualization 363.

In various implementations, displaying the three-dimensional visualization of the three-dimensional audio emission pattern includes displaying a three-dimensional shape in the representation of the scene, wherein the three-dimensional shape represents a plurality of locations in a three-dimensional coordinate system of the scene at which a volume of the audio emission pattern is equal. In various implementations, the three-dimensional shape is at least partially transparent.

In various implementations, the method 500 further includes displaying a representation of a displayed object, wherein the object associated with the three-dimensional audio emission pattern is an audio emitter associated with the displayed object. For example, in FIG. 3C, the electronic device 110 displays the representation of the virtual record player 321 and the first audio emitter is associated with the virtual record player. In various implementations, the method 500 further includes, while displaying the visualization of the three-dimensional audio emission pattern, altering a transparency of the representation of the displayed object. For example, in FIG. 3F, while the two-dimensional directivity visualization 362 is displayed, the representation of the virtual record player 321 has increased transparency, making the representation of the first audio emitter 351A and the representation of the second audio emitter 351B easier to see.

Figure 6:
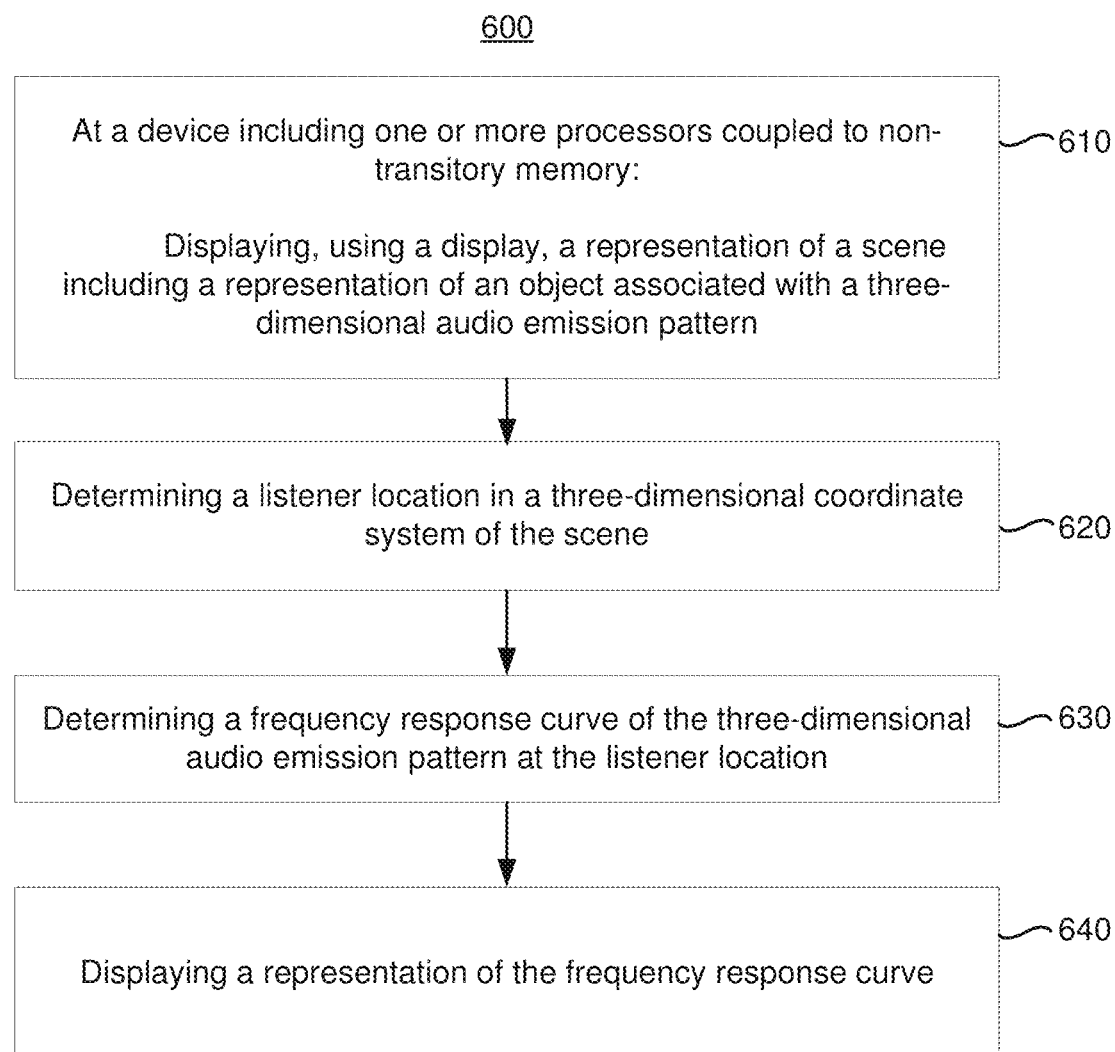
FIG. 6 is a flowchart representation of a method of displaying a frequency response curve of an audio emission pattern in accordance with some implementations.

FIG. 6 is a flowchart representation of a method 600 of displaying a frequency response curve of an audio emission pattern in accordance with some implementations. In various implementations, the method 600 is performed by a device with a display, one or more input devices, one or more processors, and non-transitory memory. In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device displaying, using the display, a representation of a scene including a representation of an object associated with a three-dimensional audio emission pattern. For example, in FIG. 3C, the electronic device 110 displays a representation of scene including a representation of the first audio emitter 351A.

The method 600 continues, in block 620, with the device determining a listener location in a three-dimensional coordinate system of the scene. For example, in FIG. 3F, the electronic device 110 determines the listener location based on the location of the listener location representation 361. In various implementations, the representation of the scene is displayed from a view location in the three-dimensional coordinate system of the scene and the listener location is the view location. In various implementations, the device determines the listener location based on user input. For example, in FIG. 3M, the electronic device 110 detects the user input 399M moving the listener location representation 361 and indicating a new listener location. In various implementations, the method 500 includes displaying a representation of the listener location in the representation of the scene. For example, in FIG. 3F, the electronic device 110 displays the listener location representation 361 in the view region 311.

The method 600 continues, in block 630, with the device determining a frequency response curve of the three-dimensional audio emission pattern at the listener location. In various implementations, the frequency response curve is based on a distance between the listener location and a location of the object in the three-dimensional coordinate system of the scene. In various implementations, the frequency response curve is based on an orientation of the object with respect to the listener location.

The method 600 continues, in block 640, with the device displaying, using the display, a representation of the frequency response curve. For example, in FIG. 3F, the electronic device 110 displays the frequency plot 365F including a frequency response curve.

In various implementations, the method 600 includes receiving a user input indicative of an updated listener location. The method 600 includes determining an updated frequency response curve of the three-dimensional audio emission pattern at the updated listener location and displaying, using the display a representation of the updated frequency response curve. For example, in FIG. 3M, the electronic device 110 detects the user input 399M moving the listener location representation 361 and indicating an updated listener location. In response, in FIG. 3N, the electronic device 110 displays an updated frequency response curve in the frequency plot 365F.

In various implementations, the method 600 includes receiving a user input requesting a preview of audio and playing, using one or more speakers, the preview of audio with the frequency response curve. For example, FIG. 3F illustrates the preview affordance 334AD which, when selected plays a preview of the audio files associated with the first audio emitter in accordance with the frequency response curve in the frequency plot 365F.

In various implementations, the method 600 includes receiving a user input changing a directional audio property of the object associated with the three-dimensional audio emission pattern from a first value to a second value. The method 600 includes determining an updated three-dimensional audio emission pattern based on the second value, determining an updated frequency response curve of the updated three-dimensional audio emission pattern at the listener location, and displaying a representation of the updated frequency response curve. For example, in FIG. 3G, the electronic device 110 detects the user input 399G changing the Z direction of the audio emission line of the first audio emitter. In response, the electronic device 110 determines an updated three-dimensional audio emission pattern, with an updated audio emission line, determines an updated frequency response curve of the updated three-dimensional audio emission pattern at the listener location, and displays, as illustrated in FIG. 3H, the updated frequency response curve in the frequency plot 365F. Thus, in various implementations, receiving the user input changing the directional audio property includes receiving user input changing an audio emission line direction property. Further examples are discussed below.

In various implementations, the three-dimensional audio emission pattern has a first directivity at a first frequency and a second directivity at a second frequency and the updated three-dimensional audio emission pattern has a third directivity at the first frequency and a fourth directivity at the fourth frequency. In various implementations, the directivity is measured as a beam width.

In various implementations, receiving the user input changing the directional audio property includes receiving user input changing an opening angle property and a difference between the first directivity and the third directivity is different, by a difference amount, than a difference between the second directivity and the fourth directivity. For example, in FIG. 3H, the electronic device 110 detects the user input 399H changing the opening angle property from 25 to 50. In response, in FIG. 3I, the frequency response curve shown in the frequency plot 365F is increased, more so for higher frequencies than lower frequencies. In particular, a difference between the first directivity (at the first frequency for the first value) and the third directivity (at the first frequency for the second value) is less than a difference between the second directivity (at the second frequency for the first value) and the fourth directivity (at the second frequency for the second value). In various implementations, the difference amount is based on a diameter property of the object associated with the three-dimensional audio emission pattern.

In various implementations, receiving the user input changing the directional audio property includes receiving user input changing a diameter property and a difference between the first directivity and the second directivity is different, by a difference amount, than a difference between the third directivity and the fourth directivity. For example, in FIG. 3I, the electronic device 110 detects the user input 399I changing the diameter property from 4 to 7. In response, in FIG. 3J, the frequency response curve shown in the frequency plot 365F is flattened. In particular, in FIG. 3J, the frequency response curve is increased, more so for higher frequencies than lower frequencies. In particular, a difference between the first directivity (at the first frequency for the first value) and second directivity (at the second frequency for the first value) is less than a difference between the third directivity (at the first frequency for the second value) and the fourth directivity (at the second frequency for the second value). Thus, in various implementations, increasing the diameter property flattens the frequency response curve and decreasing the diameter property stretches the frequency response curve. In various implementations, the difference amount is based on an opening angle property of the object associated with the three-dimensional audio emission pattern.

Figure 7:
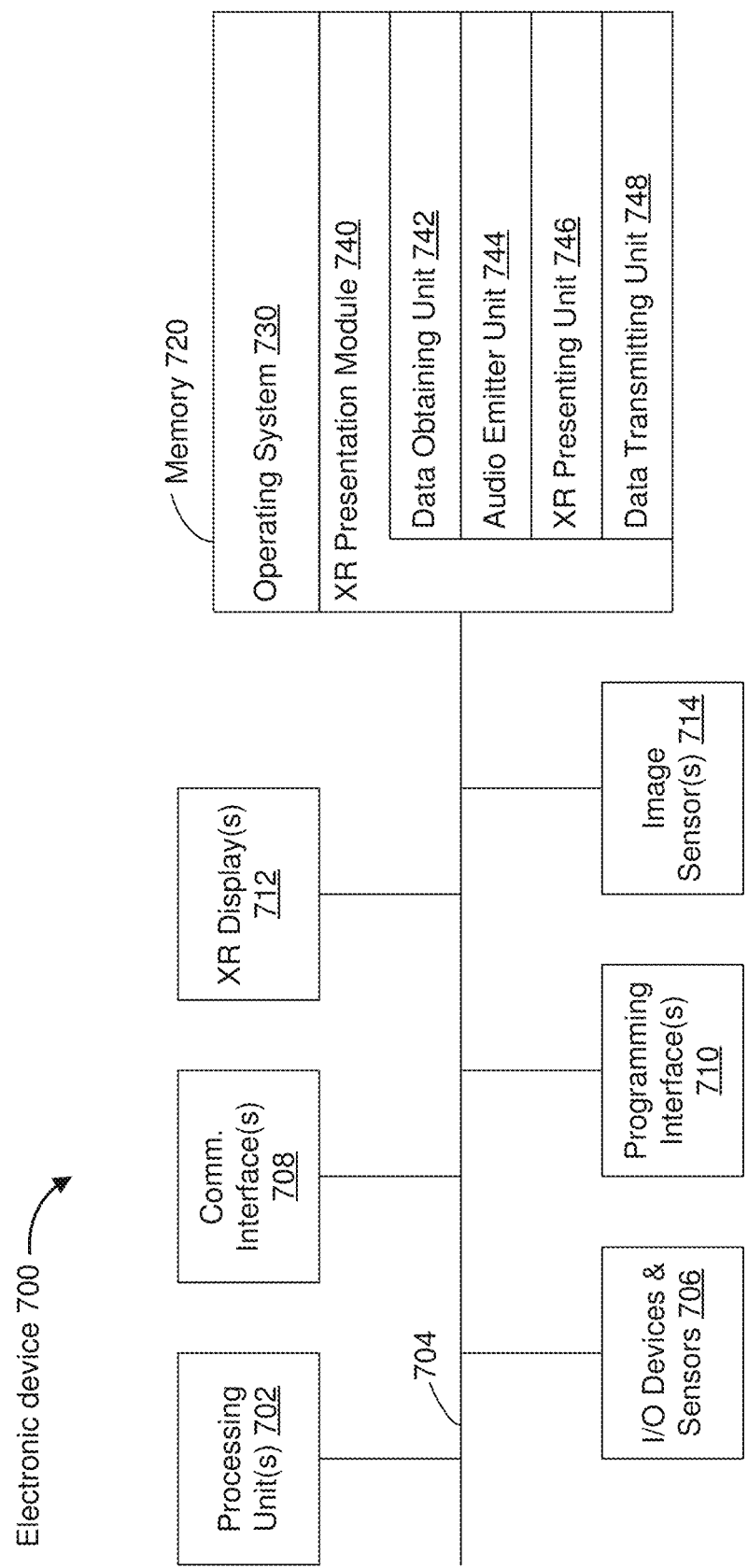
FIG. 7 is a block diagram of an electronic device in accordance with some implementations.

FIG. 7 is a block diagram of an electronic device 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702, one or more input/output (I/O) devices and sensors 706, one or more communication interfaces 708, one or more programming interfaces 710, one or more XR displays 712, one or more image sensors 714, a memory 720, and one or more communication buses 704 for interconnecting these and various other components. In various implementations, the one or more processing units 702 includes one or more of a microprocessor, ASIC, FPGA, GPU, CPU, or processing core. In various implementations, the one or more communication interfaces 708 includes a USB interface, a cellular interface, or a short-range interface.

In some implementations, the one or more communication buses 704 include circuitry that interconnects and controls communications between system components. In some implementations, the one or more I/O devices and sensors 706 include an inertial measurement unit (IMU), which may include an accelerometer and/or a gyroscope). In various implementations, the one or more I/O devices and sensors 706 includes a thermometer, a biometric sensor (e.g., blood pressure monitor, heart rate monitor, blood oxygen sensor, blood glucose sensor, etc.), a microphone, a speaker, or a depth sensor.

In some implementations, the one or more XR displays 712 are configured to present XR content to the user. In various implementations, the electronic device 700 includes an XR display for each eye of the user.

In various implementations, the one or more XR displays 712 are video passthrough displays which display at least a portion of a physical environment as an image captured by a scene camera. In various implementations, the one or more XR displays 712 are optical see-through displays which are at least partially transparent and pass light emitted by or reflected off the physical environment.

In some implementations, the one or more image sensors 714 are configured to obtain image data that corresponds to at least a portion of the face of the user that includes the eyes of the user. In various implementations, such an image sensor is referred to as an eye-tracking camera. In some implementations, the one or more image sensors 714 are configured to obtain image data that corresponds to the physical environment as would be viewed by the user if the electronic device 700 was not present. In various implementations, such an image sensor is referred to as a scene camera. The one or more image sensors 714 can include an RGB camera (e.g., with a complimentary metal-oxide-semiconductor (CMOS) image sensor or a charge-coupled device (CCD) image sensor), an infrared (IR) camera, an event-based camera, or any other sensor for obtaining image data.

In various implementations, the memory 720 includes high-speed random-access memory. In various implementations, the memory 720 includes non-volatile memory, such as a magnetic disk storage device, an optical disk storage device, or a flash memory device. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and an XR presentation module 740.

The operating system 730 includes procedures for handling various basic system services and for performing hardware dependent tasks. In some implementations, the XR presentation module 740 is configured to present XR content to the user via the one or more XR displays 712. To that end, in various implementations, the XR presentation module 740 includes a data obtaining unit 742, an audio emitter unit 744, an XR presenting unit 746, and a data transmitting unit 748.

In some implementations, the data obtaining unit 742 is configured to obtain data (e.g., presentation data, interaction data, sensor data, location data, etc.). The data may be obtained from the one or more processing units 702 or another electronic device. To that end, in various implementations, the data obtaining unit 742 includes instructions and/or logic therefor, and heuristics and metadata therefor.

In some implementations, the audio emitter unit 744 is configured to provide an interface for changing the audio properties of an object and/or determine a volume for audio associated with the object based on the audio properties. To that end, in various implementations, the audio emitter unit 744 includes instructions and/or logic therefor, and heuristics and metadata therefor.

In some implementations, the XR presenting unit 746 is configured to present XR content via the one or more XR displays 712. To that end, in various implementations, the XR presenting unit 746 includes instructions and/or logic therefor, and heuristics and metadata therefor.

In some implementations, the data transmitting unit 748 is configured to transmit data (e.g., presentation data, location data, etc.) to the one or more processing units 702, the memory 720, or another electronic device. To that end, in various implementations, the data transmitting unit 748 includes instructions and/or logic therefor, and heuristics and metadata therefor.

Although the data obtaining unit 742, the audio emitter unit 744, the XR presenting unit 746, and the data transmitting unit 748 are shown as residing on a single electronic device 700, it should be understood that in other implementations, any combination of the data obtaining unit 742, the audio emitter unit 744, the XR presenting unit 746, and the data transmitting unit 748 may be located in separate computing devices.

While various aspects of implementations within the scope of the appended claims are described above, it should be apparent that the various features of implementations described above may be embodied in a wide variety of forms and that any specific structure and/or function described above is merely illustrative. The terminology used herein is for the purpose of describing particular implementations only and is not intended to be limiting of the claims. Based on the present disclosure one skilled in the art should appreciate that an aspect described herein may be implemented independently of any other aspects and that two or more of these aspects may be combined in various ways.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, which changing the meaning of the description, so long as all occurrences of the "first object" are renamed consistently and all occurrences of the "second object" are renamed consistently. The first object and the second object are both objects, but they are, in various implementations, not the same object.

What is claimed is:

1. A method comprising:
   at a device including one or more processors coupled to non-transitory memory:

displaying, using a display, a representation of a scene including a representation of an object associated with a three-dimensional audio emission pattern;

determining a listener location in a three-dimensional coordinate system of the scene;

determining a frequency response curve of the three-dimensional audio emission pattern at the listener location; and displaying a representation of the frequency response curve.

2. The method of claim 1, wherein the representation of the scene is displayed from a view location in the three-dimensional coordinate system of the scene and the listener location is the view location.

3. The method of claim 1, further comprising displaying a representation of the listener location in the representation of the scene.

4. The method of claim 1, further comprising:

receiving a user input indicative of an updated listener location;

determining an updated frequency response curve of the three-dimensional audio emission pattern at the updated listener location; and displaying, using the display, a representation of the updated frequency response curve.

5. The method of claim 1, further comprising:

receiving a user input requesting a preview of audio; and playing, using one or more speakers, the preview of audio with the frequency response curve.

6. The method of claim 1, further comprising:

receiving a user input changing a directional audio property of the object associated with the three-dimensional audio emission pattern from a first value to a second value;

determining an updated three-dimensional audio emission pattern based on the second value;

determining an updated frequency response curve of the updated three-dimensional audio emission pattern at the listener location; and displaying, using the display, a representation of the updated frequency response curve.

7. The method of claim 6, wherein the three-dimensional audio emission pattern has a first directivity at a first frequency and a second directivity at a second frequency and the updated three-dimensional audio emission pattern has a third directivity at the first frequency and a fourth directivity at the second frequency.

8. The method of claim 7, wherein receiving the user input changing the directional audio property includes receiving user input changing an opening angle property and a difference between the first directivity and the third directivity is different, by a difference amount, than a difference between the second directivity and the fourth directivity.

9. The method of claim 8, wherein the difference amount is based on a diameter property of the object associated with the three-dimensional audio emission pattern.

10. The method of claim 6, wherein receiving the user input changing the directional audio property includes receiving user input changing a diameter property and a difference between the first directivity and the second directivity is different, by a difference amount, than a difference between the third directivity and the fourth directivity.

11. The method of claim 10, wherein the difference amount is based on an opening angle property of the object associated with the three-dimensional audio emission pattern.

12. The method of claim 6, wherein receiving the user input changing the directional audio property includes receiving user input changing an audio emission line direction property.

13. A device comprising:

non-transitory memory; and one or more processors to:

display, using a display, a representation of a scene including a representation of an object associated with a three-dimensional audio emission pattern;

determine a listener location in a three-dimensional coordinate system of the scene; and determine a frequency response curve of the three-dimensional audio emission pattern at the listener location; and display, using the display, a representation of the frequency response curve.

14. The device of claim 13, wherein the representation of the scene is displayed from a view location in the three-dimensional coordinate system of the scene and the listener location is the view location.

15. The device of claim 13, wherein the one or more processors are further to display a representation of the listener location in the representation of the scene.

16. The device of claim 13, wherein the one or more processors are to:

receive a user input changing a directional audio property of the object associated with the three-dimensional audio emission pattern from a first value to a second value;

determine an updated three-dimensional audio emission pattern based on the second value;

determine an updated frequency response curve of the updated three-dimensional audio emission pattern at the listener location; and display, using the display, a representation of the updated frequency response curve.

17. The device of claim 16, wherein the three-dimensional audio emission pattern has a first directivity at a first frequency and a second directivity at a second frequency and the updated three-dimensional audio emission pattern has a third directivity at the first frequency and a fourth directivity at the second frequency, wherein the one or more processors are to receive the user input changing the directional audio property by receiving user input changing an opening angle property, and wherein a difference between the first directivity and the third directivity is different, by a difference amount, than a difference between the second directivity and the fourth directivity based on a diameter property of the object associated with the three-dimensional audio emission pattern.

18. The device of claim 16, wherein the three-dimensional audio emission pattern has a first directivity at a first frequency and a second directivity at a second frequency and the updated three-dimensional audio emission pattern has a third directivity at the first frequency and a fourth directivity at the second frequency, wherein the one or more processors are to receive the user input changing the directional audio property by receiving user input changing a diameter property, and wherein a difference between the first directivity and the second directivity is different, by a difference amount, than a difference between the third directivity and the fourth directivity based on an opening angle property of the object associated with the three-dimensional audio emission pattern.

19. The device of claim 16, wherein the one or more processors are to receive the user input changing the directional audio property by receiving user input changing an audio emission line direction property.

20. A non-transitory memory storing one or more programs, which, when executed by one or more processors of a device, cause the device to:
- display, using a display, a representation of a scene including a representation of an object associated with a three-dimensional audio emission pattern;
- determine a listener location in a three-dimensional coordinate system of the scene; and
- determine a frequency response curve of the three-dimensional audio emission pattern at the listener location; and
- display, using the display, a representation of the frequency response curve.

* * * * *